(12) United States Patent
Sarin

(10) Patent No.: US 12,367,492 B2
(45) Date of Patent: Jul. 22, 2025

(54) PROXIMITY-BASED TOKEN ISSUANCE SYSTEM

(71) Applicant: PayPal, Inc., San Jose, CA (US)

(72) Inventor: Pankaj Sarin, Fremont, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 17/324,991

(22) Filed: May 19, 2021

(65) Prior Publication Data

US 2022/0374903 A1    Nov. 24, 2022

(51) Int. Cl.
*G06Q 20/40* (2012.01)
*G06Q 20/38* (2012.01)

(52) U.S. Cl.
CPC ..... *G06Q 20/4015* (2020.05); *G06Q 20/3821* (2013.01); *G06Q 20/4016* (2013.01)

(58) Field of Classification Search
CPC ........... G06Q 20/4015; G06Q 20/3821; G06Q 20/4016
See application file for complete search history.

(56) References Cited

U.S. PATENT DOCUMENTS

| | | | |
|---|---|---|---|
| 10,504,094 B1 * | 12/2019 | Gaudin ................. | G06Q 20/36 |
| 10,922,672 B2 * | 2/2021 | Chitalia ................ | H04L 9/3213 |
| 10,997,577 B2 * | 5/2021 | Vyas .................... | G06Q 20/3821 |
| 11,202,166 B2 * | 12/2021 | Bellenger ............. | H04W 12/08 |
| 2010/0114776 A1 | 5/2010 | Weller et al. | |
| 2011/0282778 A1 | 11/2011 | Wright et al. | |
| 2014/0052617 A1 | 2/2014 | Chawla et al. | |
| 2015/0078741 A1 | 3/2015 | O'Connor et al. | |
| 2015/0254635 A1 * | 9/2015 | Bondesen ............. | G06Q 20/36 705/41 |
| 2016/0189146 A1 * | 6/2016 | Cattone ............. | G06Q 20/3829 398/128 |
| 2016/0283942 A1 * | 9/2016 | Chitragar ............. | G06Q 20/204 |
| 2017/0221059 A1 * | 8/2017 | Sethi .................. | G06Q 20/3224 |
| 2018/0012318 A1 * | 1/2018 | Li ........................ | H04B 10/116 |
| 2018/0181955 A1 * | 6/2018 | Woods ............... | G06Q 20/3821 |
| 2019/0172045 A1 * | 6/2019 | Dunjic ............... | G06Q 20/3224 |

OTHER PUBLICATIONS

Cerruela García G, Luque Ruiz I, Gomez-Nieto MÁ. State of the Art, Trends and Future of Bluetooth Low Energy, Near Field Communication and Visible Light Communication in the Development of Smart Cities. Sensors (Basel). Nov. 23, 2016;16(11):1968. doi: 10.3390/s16111968. (Year: 2016).*

(Continued)

*Primary Examiner* — David P Sharvin
*Assistant Examiner* — Steven R Chism
(74) *Attorney, Agent, or Firm* — HAYNES AND BOONE, LLP

(57) ABSTRACT

A token issuance system receives a first purchase request for at least one of a good or a service from a merchant at a merchant location. The system generates a payment token based on the purchase request such that the payment token is associated with a proximity condition. The system then determines that a location of a user device that is associated with the purchase request satisfies the proximity condition. In response to the determining that the location of the user device that is associated with the purchase request satisfies the proximity condition, the system provides the payment token to the merchant.

20 Claims, 9 Drawing Sheets

(56) References Cited

OTHER PUBLICATIONS

"Method and System for Detecting Possible Fraud in a Transaction", An IP.com Prior Art Database Technical Disclosure, Authors et. al.: Disclosed Without Attribution, IP.com No. IPCOM000244805D, IP.com Electronic Publication Date: Jan. 18, 2016 (Year: 2016).*
International Search Report and Written Opinion for Application No. PCT/US2022/029317 mailed on Sep. 1, 2022, 10 pages.
International Preliminary Report on Patentability for Application No. PCT/US2022/029317 mailed on Nov. 30, 2023, 9 pages.

* cited by examiner

US 12,367,492 B2

PROXIMITY-BASED TOKEN ISSUANCE SYSTEM

TECHNICAL FIELD

The present disclosure generally relates electronic tokens and, more particularly, to a proximity-based token issuance system for communicating tokens between entities.

BACKGROUND

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, VENMO®, Inc. of San Jose, CA or PAYPAL®, Inc. of San Jose, CA. Such payment service providers can make transactions easier and safer for the parties involved. Purchasing with the assistance of a payment service provider from the convenience of virtually anywhere using a mobile device is one main reason why on-line and mobile purchases are growing very quickly.

Many payment transactions enabled by online or mobile payment service providers such as, for example, retail purchases, payment transactions, and the like, are made electronically using electronic devices, such as mobile phones or mobile computing devices. For example, a consumer may install a payment application provided by the payment service provider on his or her mobile device to facilitate payments to various merchants or recipients. In some instances, a consumer may facilitate a purchase with the mobile device for a product and/or service that requires the user to obtain that product and/or service at a merchant location or delivery of the product and/or service to the consumer.

The increased use of mobile payment transactions oftentimes requires the consumer to pick up multiple purchases made online, through a mobile device, or other means. This can result in increased chances of fraudulent transactions, misappropriation of sensitive data, and/or inefficiencies associated with confirmation and pickup of purchases.

Figure 1:
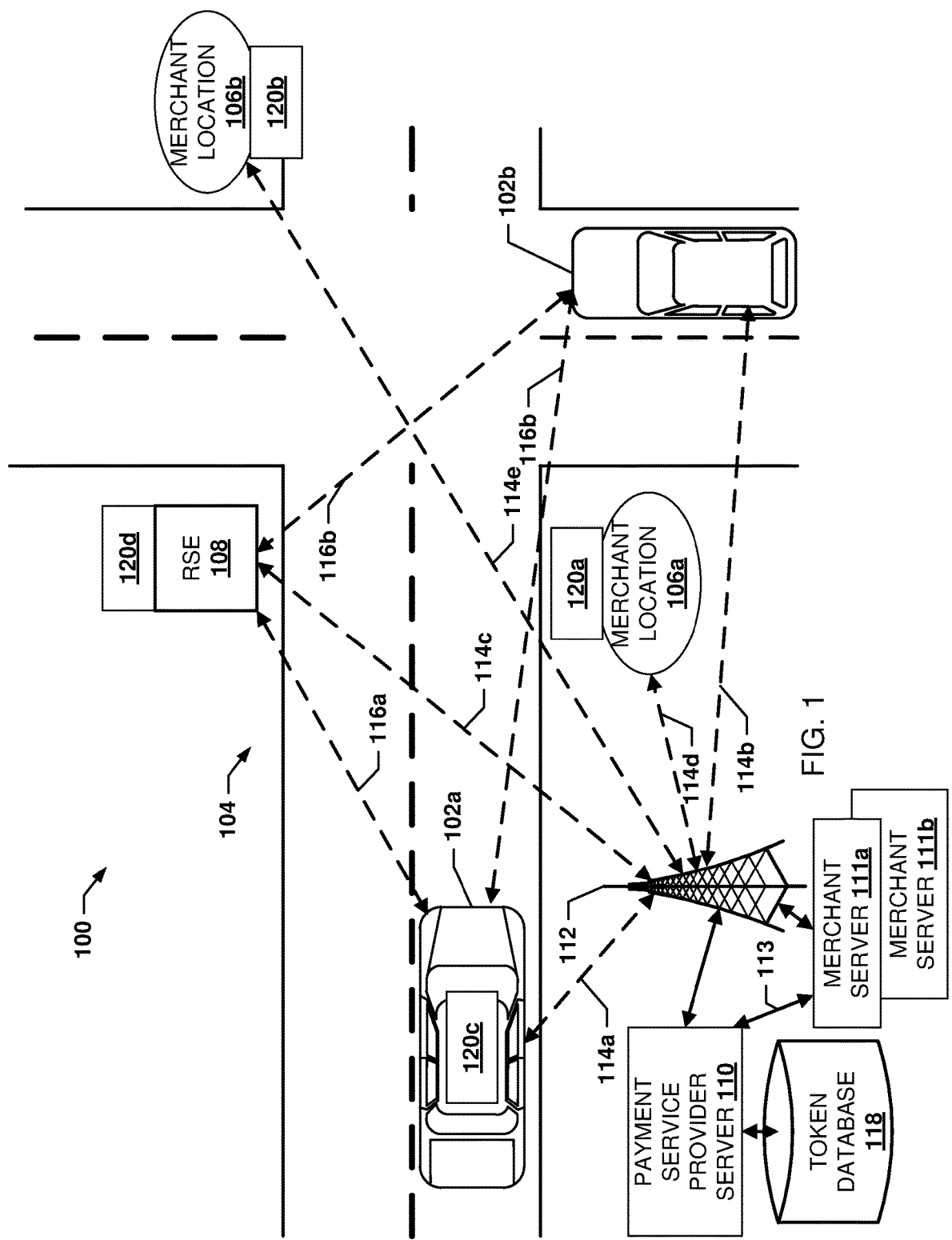
FIG. 1 is a schematic view illustrating an embodiment of a proximity-based token issuance system.

Embodiments of the present disclosure and their advantages are best understood by referring to the detailed description that follows. It should be appreciated that like reference numerals are used to identify like elements illustrated in one or more of the figures, where showings therein are for purposes of illustrating embodiments of the present disclosure and not for purposes of limiting the same.

DETAILED DESCRIPTION

The disclosure provides systems, methods, and computer program products for proximity-based token issuance for completing a purchase request. Contactless transactions for goods and/or services are increasing. Some consumers may order goods and/or services ahead of time and pay while picking up in-store. Likewise, deliveries of goods and/or services to a consumer are often paid before the good and/or service arrives at the consumer's location. Invariably, consumers hop between various stores in a confined geolocation (e.g., to obtain a pizza order and then obtain an online order or an offline order (e.g., a phone order) for a good at a department store).

Embodiments of the present disclosure use imaging sensors (e.g., (e.g., light detection and ranging (lidar)) and/or positioning sensors (e.g., Global Position System (GPS)) as well as other environmental information to provide proximity-based payments tokens to authorize or process payments while the consumer and/or the merchant is in route to complete a purchase request along with intelligently managing the priority of the payment tokens. A payment service provider such as, for example, VENMO®, Inc. of San Jose, CA or PAYPAL®, Inc. of San Jose, CA may be authorized by a user of a user account provided by the payment service provider to manage payments using a vehicle's infrastructure and/or other Internet of Things (IoT) devices that are provided in a physical environment that the user/merchant traverses to complete the purchase request for goods and/or services. When the consumer and merchant come within a certain distance or proximity of each other, a payment token may be provided to the merchant to complete the purchase request. The merchant may use the token to authorize a debit from an account associated with the user and provide to the payment service provider, the user, and/or the merchant that the purchase request has been completed. When, for example, the user arrives at a merchant location, an associate at the merchant location may be notified that the purchase request has completed, and the associate may provide the good and/or service associated with the purchase request to the user. In various embodiments, different payment account schemes may be tied to different merchants. For example, a first credit card may be tied to a first merchant while a wallet provided by the payment service provider may be associated to a second merchant.

In a particular example, a user places an offline order at a restaurant for food and an online order through a merchant application or website at a department store for pickup of some new clothes. The respective merchants broadcast a pending payment token request against the user identity (e.g., a user phone number, an address, and/or an account number tied to a merchant user account). The user may drive a vehicle, (e.g., an autonomous car, a semi-autonomous car, or a non-autonomous car) with imaging sensors, and location detection and distance calculation capabilities. The imaging waves/light waves may be used to compute the distance between the car/user and the merchant locations (e.g., the restaurant and the department store). If the distance is calculated as 500 m for the restaurant and 300 m for the department store and a default payment token issuance distance is set as 400 m, then the payment token may be issued and applied using the payment service provider service to the department store first, given the threshold. The payment token may not be provided to the restaurant until the calculated distances satisfies the default token issuance distance.

In addition to proximity, data from the physical environment that may be obtained by the imaging sensors and/or other sensors in the physical environment may be used to provide a model score or a likelihood of fraud occurrence that satisfies a risk condition around a particular radius before the payment token is provided to the merchant. Thus, the payment service provider may skip the application of a payment token until it is safe to apply. Similarly, data from the imaging sensor may be used by the payment service provider to apply a payment token at a designated spot or upon nearing a designated spot if the overall payments processing latency is low or a spotty network area is detected. In other examples, light waves may be associated with a unique payment token construct that can be assigned to each light wave with a pre-set time-to-live. Light waves may be unique for each user device/vehicle and used to verify that the payment token should be sent to the merchant if those light waves are detected within the environment.

Referring now to FIG. 1, an embodiment of a proximity-based token issuance system 100 is illustrated. In the illustrated embodiment, the proximity-based token issuance system 100 includes an autonomous vehicle 102a (e.g., a self-driving vehicle) and a non-autonomous vehicle 102b provided in a physical environment 104. The physical environment 104 may be any indoor and/or outdoor space that may be contiguous or non-contiguous. For example, the physical environment 104 may include a roadway, a tunnel, a bridge, a waterway, a railway, and/or any other transportation infrastructure that would be apparent to one of skill in the art. In other examples, the physical environment 104 may include a yard, a home, a business, a park, a stadium, a museum, an amusement park, an access space, an underground shaft, a mall, an airspace, a body of water, and/or other spaces. The physical environment 104 may be defined by geofencing techniques that may include specific geographic coordinates such as latitude, longitude, and/or altitude, and/or operate within a range defined by a wireless communication signal. The physical environment 104 may include a plurality of merchant locations such as a merchant location 106a and a merchant location 106b such as, for example, a gas station, a restaurant, a department store, a grocery store, a toll both, a drycleaner, an amusement park and/or any other merchant location that would be apparent to one of skill in the art in possession of the present disclosure. While the physical environment 104 may include the autonomous vehicle 102a and/or the non-autonomous vehicle 102b, other user devices (e.g., transportation devices, tablets, laptops, smart phones, wearables, and/or other user devices that would be apparent to one of skill in the art in possession of the present disclosure) could be used in place of or in addition to the autonomous vehicle 102a and/or the non-autonomous vehicle 102b and still fall under the scope of the present disclosure.

In various embodiments, the autonomous vehicle 102a may be implemented as an autonomous unmanned aerial vehicle (UAV), an autonomous car, an autonomous truck, an autonomous bus, an autonomous train, an autonomous submersible, an autonomous boat, an autonomous robot, an autonomous unicycle, an autonomous snowmobile, autonomous construction equipment, autonomous farming vehicles, and/or any unmanned or manned vehicular device that would be apparent to one of skill in the art in possession of the present disclosure. In the illustrated examples of the present disclosure, the autonomous vehicle is depicted as an autonomous automobile. In various embodiments, vehicles may be described as autonomous which may include fully autonomous vehicles and/or semi-autonomous vehicles. As such, the autonomous vehicle 102a may each include an autonomous vehicle controller for making and executing decisions for the autonomous vehicle 102a. However, in other embodiments, the autonomous vehicle 102a may be a non-autonomous vehicle but include sensors and/or systems that are used for the purposes of the methods and systems described in the present disclosure that may be typically found in autonomous vehicles. In various embodiments, the non-autonomous vehicle 102b may be implemented as a UAV, a car, a truck, a bus, a train, a motorcycle, a submersible, a boat, a snowmobile, a unicycle, construction equipment, farming equipment, and/or any unmanned or manned vehicular device that is controlled by a human user (e.g., non-autonomous).

In various embodiments, the proximity-based token issuance system 100 may include a roadside equipment (RSE) unit 108. The RSE unit 108 may be provided in the physical environment 104 to direct, inform, control, and/or warn traffic (e.g., the autonomous vehicle 102a, the non-autonomous vehicle 102b, and/or any other actors (e.g., pedestrians)) within the physical environment 104. For example, the RSE unit 108 may be a railroad crossing gate, a tollbooth, a parking lot gate, signage, traffic lights, or other RSE units that would be apparent to one of skill in the art in possession of the present disclosure. Of course, in various embodiments, some or all of the components of the RSE unit 108 could be physically located other than "roadside", such as in a cabinet, a signal head, a buoy, a balloon in the atmosphere, or otherwise be a dedicated sensor system for the proximity-based token issuance system 100. Thus, while the present disclosure discusses an RSE unit when referring to autonomous automobiles, the RSE unit 108 may be generally referred to herein as a traffic control unit or a physical environment sensor system and may be provided in the physical environment 104 (e.g., bodies of water, in the atmosphere, in a field) where other types of autonomous vehicles other than autonomous automobiles are present. The RSE unit 108 may be used to control many different types of traffic equipment and can be used to collect and send data about the physical environment 104 to a central monitoring station for further analysis or action and/or the autonomous vehicle 102a, using common networking and communication techniques, commonly specified 5G or subsequently developed adaptive multi-bandwidth approaches. As such, the autonomous vehicle 102a and the RSE unit 108 may include communication units having one or more transceivers to enable the autonomous vehicle 102a and the RSE unit 108 to communicate with each other and/or a payment service provider server 110. Accordingly and as discussed in further detail below, the autonomous vehicle 102a may be in communication with the RSE unit 108 directly or indirectly. As used herein, the phrase "in communication," including variances thereof, encompasses direct communication and/or indirect communication through one or more intermediary components and does not require direct physical (e.g., wired and/or wireless) communication and/or constant communication, but rather additionally includes selective communication at periodic or aperiodic intervals, as well as one-time events.

For example, the autonomous vehicle 102a and/or the RSE unit 108 in the proximity-based token issuance system 100 of FIG. 1 may include first (e.g., long-range) transceiver(s) to permit the autonomous vehicle 102a, the merchant location 106a, the merchant location 106b, and/or the RSE unit 108 to communicate with a network 112 via a communication channel 114a and/or a communication channel 114b. The network 112 may be implemented by an example mobile cellular network, such as a long-term evolution (LTE) network or other third generation (3G), fourth generation (4G) wireless network, or fifth generation (5G) wireless network. However, in some examples, the network 112 may be additionally or alternatively be implemented by one or more other communication networks, such as, but not limited to, a satellite communication network, a microwave radio network, and/or other communication networks.

The autonomous vehicle 102a, and/or the RSE unit 108 additionally may include second (e.g., short-range) transceiver(s) to permit the autonomous vehicle 102a, the non-autonomous vehicle, and/or the RSE unit 108 to communicate with each other via communication channels 116a, 116b, and/or 116c. While not illustrated, the merchant locations 106a and 106b may be equipped with second (e.g., short-range) transceiver(s) that allow those merchant locations to communicate with the autonomous vehicle 102a, the non-autonomous vehicle, and/or the RSE unit 108. Furthermore, the second transceiver may be used for vehicle-to-vehicle communications between the autonomous vehicle 102a and other autonomous vehicles. In the illustrated example of FIG. 1, such second transceivers are implemented by a type of transceiver supporting short-range (e.g., operate at distances that are shorter than the long-range transceivers) wireless networking. For example, such second transceivers may be implemented by a Wi-Fi transceiver (e.g., via a Wi-Fi Direct protocol), a Bluetooth® transceiver, an infrared (IR) transceiver, a Zigbee transceiver, and/or other transceivers that are configured to allow the autonomous vehicle 102a and/or the RSE unit 108 to intercommunicate via an ad-hoc or other wireless network.

The merchant location 106a, the merchant location 106b, the autonomous vehicle 102a and/or the RSE unit 108 may also include a visual indicator system 120a, 120b, 120c, and 120d, respectively, that may provide visual indications (e.g., light signals from the visual spectrum of the electromagnetic spectrum that is visible to the human eye (e.g., wavelengths of 380-740 nm)) based on information received from the physical environment 104 and respective merchant location information, autonomous vehicle information, and/or RSE unit information for machine-to-human communication. However, in some embodiments the visual indicator systems may provide other visual/light indications that have wavelengths that are in the ultraviolet or infrared spectrums for machine-to-machine communication. Each visual indicator system 120a-120d may also be configured to detect the visual indications provided by other visual indicator systems within the physical environment 104. In various embodiments, the non-autonomous vehicle may include a visual indicator system (not illustrated) such that the non-autonomous vehicle may be considered an RSE unit 108 or a merchant location (e.g., one of merchant locations 106a or 106b within the physical environment 104).

The proximity-based token issuance system 100 also includes or may be in communication with a payment service provider server 110, a merchant server 111a and a merchant server 111b. For example, the payment service provider server 110 and/or the merchant servers 111a and 111b may include one or more servers, storage systems, cloud computing systems, and/or other computing devices (e.g., desktop computing device(s), laptop/notebook computing device(s), tablet computing device(s), mobile phone(s), etc.). As discussed below, the payment service provider server 110 may be coupled to a payment token database 118 that is configured to provide repositories such as a token repository of tokens, visual indication repository and instructions for those visual indications for devices within the physical environment 104. Also, the payment service provider server 110 may be configured to computationally process sensor data (e.g., sensor data that includes environmental information, vehicle information, visual indicator information, and/or other information) received from the visual indicator systems 120a-120d, the RSE unit 108, the autonomous vehicle 102a, and/or the non-autonomous vehicle 102b and render instructions to the autonomous vehicle 102a and/or RSE unit 108.

The merchant servers 111a and 111b may be coupled to the payment service provider server 110 via a network 113. In the illustrated embodiment and as discussed herein, the merchant server 111a and the merchant location 106a are associated with a first merchant, and the merchant server 111b and the merchant location 106b are associated with a second merchant that is different than the first merchant. The merchant server 111a and the merchant server 111b may provide a respective merchant application to users (e.g., the autonomous vehicle 102a and/or another user device). In an example, the user may receive the merchant application already installed on the autonomous vehicle 102a and/or other user device. In another example, the user may download the merchant application onto the autonomous vehicle 102a and/or other user device. In an example, the merchant application is a mobile app installed on the autonomous vehicle 102a and accessible via a user interface on the autonomous vehicle 102a. In another example, the merchant application is a web application accessible via a URL to which a browser executing on the autonomous vehicle 102a points. As discussed below, to complete a purchase request on the merchant application and the payment service provider application, a payment token may be required to be generated by a token service provider and provided to the merchant server 111 to send through a network to complete a transaction as would be apparent to one of skill in the art in possession of the present disclosure. While a proximity-based token issuance system 100 has been illustrated and described, one of skill in the art in possession of the present disclosure will recognize that the teachings of the present disclosure will be beneficial for a variety of proximity-based token issuance systems that would be apparent to one of skill in the art in possession of the present disclosure and, as such, a wide variety of modifications to the number, types, and orientation of devices in the proximity-based token issuance system 100 will fall within the scope of the present disclosure as well.

Figure 2:
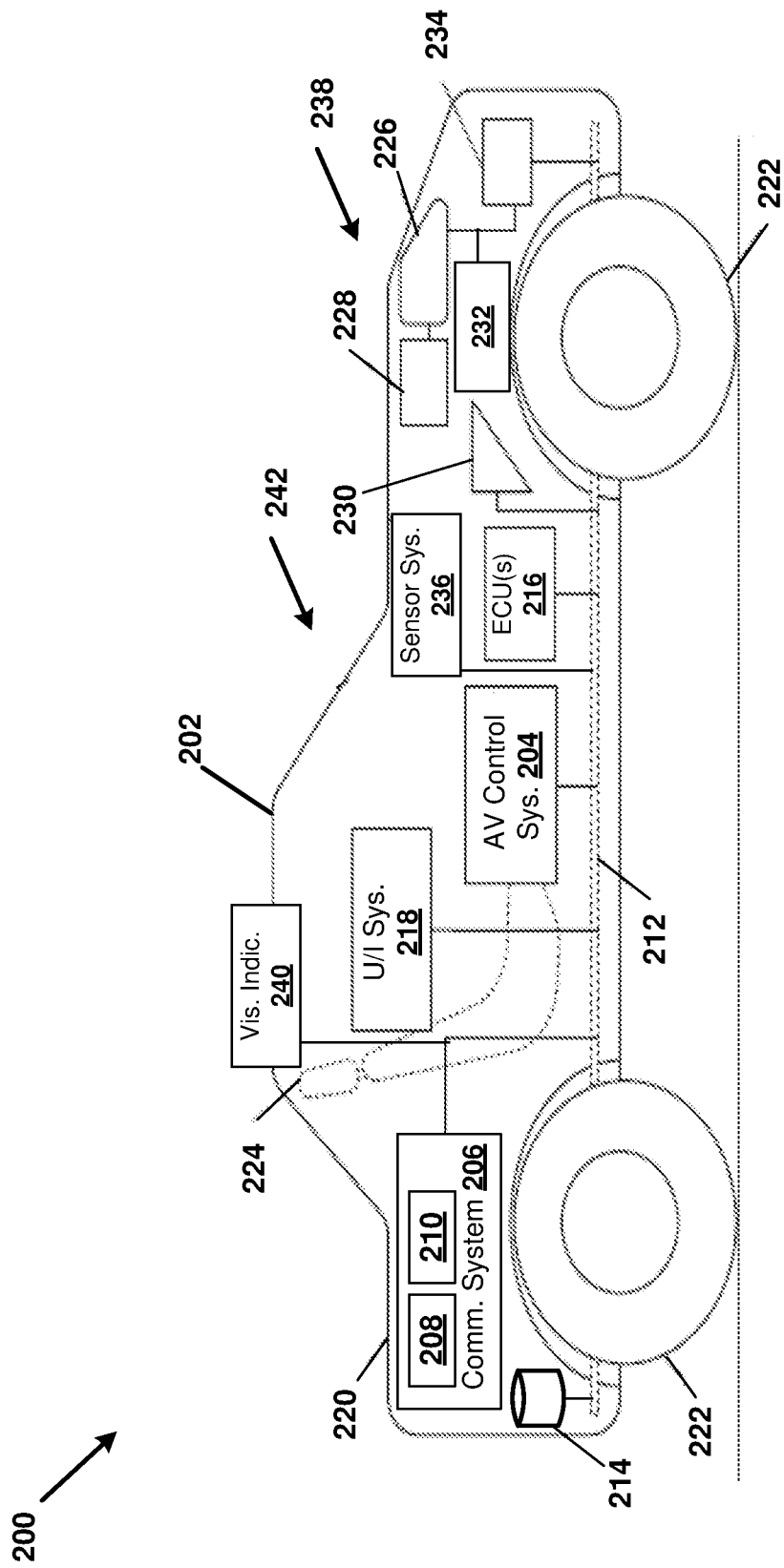
FIG. 2 is a schematic view illustrating an embodiment of an autonomous vehicle used in the proximity-based token issuance system of FIG. 1.

Referring now to FIG. 2, an embodiment of an autonomous vehicle 200 is illustrated that may be the autonomous vehicle 102a discussed above with reference to FIG. 1. While the autonomous vehicle 200 is illustrated as an autonomous car, one of skill in the art in possession of the present disclosure may recognize that the autonomous vehicle 200 may be provided by a UAV, a robot, an unmanned vehicular device (e.g., land or water), and/or other vehicular device described above or that would be apparent to one of skill in the art in possession of the present disclosure. In the illustrated embodiment, the autonomous vehicle 200 includes a chassis 202 that houses the components of the autonomous vehicle 200. Several of these components are illustrated in FIG. 2. For example, the chassis 202 may house a processing system (not illustrated) and a non-transitory memory system (not illustrated) that includes instructions that, when executed by the processing system, cause the processing system to provide an autonomous vehicle controller 204 that is configured to perform the functions of the autonomous vehicle controllers and/or the autonomous vehicles discussed below.

The chassis 202 may further house a communication system 206 that is coupled to the autonomous vehicle controller 204 (e.g., via a coupling (e.g., a bus 212) between the communication system 206 and the processing system). The communication system 206 may include software or instructions that are stored on a computer-readable medium and that allow the autonomous vehicle 200 to send and receive information through the communication networks discussed above. For example, the communication system 206 may include a first communication interface 208 to provide for communications through the communication network 112 as detailed above (e.g., first (e.g., long-range) transceiver(s)). In an embodiment, the first communication interface 208 may be a wireless antenna that is configured to provide communications with IEEE 802.11 protocols (Wi-Fi), cellular communications, satellite communications, other microwave radio communications and/or communications. The communication system 206 may also include a second communication interface 210 that is configured to provide direct communication with other autonomous vehicles, the RSE unit 108, the merchant locations 106a and 106b, and/or other devices within the physical environment 104 discussed above with respect to FIG. 1 (e.g., second (e.g., short-range) transceiver(s)). For example, the second communication interface 210 may be configured to operate according to wireless protocols such as Bluetooth®, Bluetooth® Low Energy (BLE), near field communication (NFC), infrared data association (IrDA), ANT®, Zigbee®, Z-Wave® IEEE 802.11 protocols (Wi-Fi), and other wireless communication protocols that allow for direct communication between devices.

The communication system 206 of the illustrated example manages communications between the autonomous vehicle 200 and network entities (e.g., a car manufacturer, a telecommunication service provider, an internet service provider, a media provider, a certificate authority, etc.) via a wired and/or wireless connection (e.g., an IEEE 802.11 wireless connection, a Bluetooth connection, a cable/DSL/satellite modem, a cell tower, etc.). The communication system 206 of the illustrated example maintains network information (e.g., a network address, network settings, etc.) required to send and/or receive data over the various communication platforms. The communication system 206 manages the connections between the vehicle and outside entities (e.g., a Bluetooth connection between a mobile device and the example autonomous vehicle controller 204). In some examples, the communication system 206 may establish communicative connections with service providers that may provide the payment service provider server 110, the merchant servers 111a and 111b, and/or different network entities (e.g., a car manufacturer, a telecommunication service provider, an internet service provider, a media provider, a certificate authority, etc.) to send data from the autonomous vehicle 200 to the network entities and/or receive data from the network entities for delivery to the vehicle (e.g., driving profiles). In addition, the communication system 206 may communicate with a computing device, such as a personal electronic device (e.g., a smartphone, a tablet, a smart watch, etc.), a personal computer (e.g., a desktop, a laptop, etc.), a diagnostic computer (e.g., at a dealership, etc.), etc. In some examples, one or more computing devices connected to the autonomous vehicle 200 via the communication system 206 may transmit and receive information, such as vehicle diagnostic data, media files (e.g., movies, music, television programs, etc.) uploaded to a memory of the autonomous vehicle 200, firmware and/or software updates, driving profiles, environmental information about the physical environment 104, authentication identifiers (e.g., cryptographic keys), visual indicator information, and/or other autonomous vehicle information that would be apparent to one of skill in the art in possession of the present disclosure.

The chassis 202 may also house an autonomous vehicle storage system 214 that is coupled to the autonomous vehicle controller 204 through the processing system (e.g., via the bus 212). The autonomous vehicle storage system 214 may store sensor data, autonomous vehicle instructions and rules, visual indicator profiles that include visual indications and associated rules and instructions, and/or any other information or instructions that would be apparent to one of skill in the art in possession of the present disclosure.

The chassis 202 may also house a plurality of ECUs 216 that are coupled (e.g., via the bus 212) to the autonomous vehicle controller 204 through the processing system. The example ECUs 216 of FIG. 2 may be discrete computing devices. The example ECUs 216 may include a processor (e.g., a microcontroller) to process data and execute programmable instructions (e.g., assembly level instructions, functional sequential instructions, and/or object-oriented instructions). The example ECUs 216 also are provided with on-board memory (e.g., Static Random-Access Memory (SRAM), Electrically Erasable Programmable Read Only Memory (EEPROM), and/or Flash memory) to store data received and/or generated by the ECU 216. The example ECUs 216 are further provided with Input and/or Output (I/O) ports such as supply voltage inputs, digital and/or analog inputs, relay drivers, H-bridge drivers, injector drivers, and/or logic outputs. These I/O ports are used by the ECU 216 to receive data from sensors and transmit signals to mechanical components (e.g., actuators) to affect the mechanical components operations based on the operating parameters of the autonomous vehicle 200. The received data and/or the transmitted signals are communicated from the ECU 216 via the data bus 212 or through a directly wired connection between the ECU 216 and the mechanical component.

The example ECUs 216 of FIG. 2 control low level systems (e.g., door controls, headlight controls, engine controls, transmission controls, climate controls, seat controls, mirror controls, etc.) and/or high-level systems (e.g., radio systems, voice controls, entertainment systems, a telematic control unit managing a GPS/Navigation system, etc.) connected to the data bus 212. Each ECU 216 monitors its corresponding system by reading sensor signals. These sensors are placed on the mechanical components of the system and report factors such as position, temperature, speed, etc. These factors contribute to if, when, and/or how the ECU 216 generates output signals to execute control over the corresponding system.

For example, the ECU 216 responsible for door control has sensors monitoring door lock buttons, position of doors (e.g., open or closed), door locks (e.g., engaged or disengaged), and/or child lock switches (e.g., engaged or disengaged). Based on the readings of these sensors, the door control ECU 216 may, for example, decide on whether to generate a lock engaging signal to the doors of the vehicle.

Each of the ECUs 216 may be of different size and/or complexity according to the system the individual ECU 216 is controlling. In the illustrated example, the ECUs 216 are in communication with other units of the vehicle via the data bus 212. In some examples, the ECUs 216 may send information (e.g., the status of the systems or components of the vehicle, diagnostic information, telemetry data, environmental information, visual indicator information, etc.) to a remote device (e.g., a mobile device such as a smartphone, tablet, smartwatch, etc.) via the communication system 206 and/or may receive information (e.g., commands, driving profiles, operating parameters, firmware/software updates, media files, environmental information, signaling system standards etc.) from the remote device via the communication system 206. For example, such information may be communicated between the ECUs 216 and the remote device using a Bluetooth, Wi-Fi, or near field communication (NFC) connection generated and/or managed by the communication system 206.

The ECUs 216 may be deployed in a one-to-one fashion. That is, each ECU 216 is provided with processing power and system memory ample enough to control a corresponding single system of the vehicle. Each ECU 216 will vary in size according to the complexity of the corresponding system. In some examples, however, the ECUs 216 in the example autonomous vehicle 200 may be more robust and capable of controlling multiple systems (e.g., an ECM of the ECUs 216 may control the engine and the transmission system). For example, a robust ECU may be provided with amounts of processing power greater than a ECU processor for controlling a single system (e.g., more cores, faster clocking speeds, larger processing cache, etc.) and higher amounts of random access memory (RAM) may control more than one system as is typical of the average ECU.

The chassis 202 of the autonomous vehicle 200 may also house a user interface (UI) system 218 coupled to the autonomous vehicle controller 204 through the processing system. The user interface system 218 may include components such as a dashboard display, a media center, a center console display, user accessible buttons (e.g., climate controls, door lock controls), etc. The user interface system 218 may also include a data store to store media (e.g., movies, music, television programs, podcasts, etc.), system firmware, navigation data, diagnostic information, data collected by data collection systems (e.g., cameras mounted externally on the autonomous vehicle, weather data collection, etc.), driving profiles, service provider applications (e.g., a payment service provider application, a merchant application), and/or any other data and applications that would be apparent to one of skill in the art in possession of the present disclosure. The example user interface system 218 also functions as a human-to-machine interface that provides options to the user of the autonomous vehicle 200 and communicates the user's selected options to the corresponding ECU 216 and/or the autonomous vehicle controller 204.

In the illustrated example of FIG. 2, the chassis 202 of the autonomous vehicle 200 may include a body 220, one or more wheels 222 (in examples where the autonomous vehicle is an autonomous automobile), a seat 224, a motor 226, a cooling system 228, a transmission 230, a braking system 232, a battery 234 (e.g., an electrical system), and/or a visual indicator 240. In the illustrated example, the body 220 covers the exterior of the autonomous vehicle 200 to protect and/or contain the other parts of the autonomous vehicle 200. In various embodiments of the autonomous vehicle of FIG. 2, the ECUs 216, via commands from the autonomous vehicle controller 204, may control the braking system 232, the cooling system 228, the transmission 230, the motor 226 and/or any other autonomous vehicle systems that are apparent to one of skill in the art in possession of the present disclosure. In various embodiments, components that enable the autonomous vehicle 200 to steer, accelerate, decelerate, and/or perform any other mechanical functions may be referred to a drive system 238. As such, the drive system 238 may also include the at least two wheels 222, the motor 226, the cooling system 228, the transmission 230 and/or any other system used to navigate the autonomous vehicle 200 in the physical environment 104.

In the illustrated example, the motor 226 may be implemented by a combustion engine, a DC electric motor, and/or an AC electric motor. The motor 226 may be communicatively coupled to the ECUs 216 and the transmission 230. The example ECU 216 may receive operating power from batteries 234 to control components of the motor 226 (e.g., throttle valve, sparkplugs, pistons, fuel injectors, etc.). The ECU 216 for the motor 226 receives signals from a user (e.g., via sensors in a pedal, etc.) and/or the autonomous vehicle controller 204 to determine corresponding control signals to communicate to the example motor 226 (e.g., manipulating throttle valve, firing spark plugs, altering fuel injection quantities, etc.). In the illustrated example, the motor 226 supplies torque to the transmission 230 to drive one or more wheels 222.

In various embodiments, the autonomous vehicle 200 may include a sensor system 236 that may be housed in the chassis 202 and/or provided on the chassis 202. The sensor system 236 may be coupled (e.g., coupled via the bus 212) to the autonomous vehicle controller 204 via the processing system. The sensor system 236 may include one or more sensors that gather sensor data about the autonomous vehicle 200 and/or physical environment 104 that may be provided to the autonomous vehicle controller 204 via the bus 212. The sensor data (e.g., environmental data) may be used by the autonomous vehicle controller 204 to make decisions regarding control signals to provide to ECUs 216 of the autonomous vehicle 200 to control the various systems when the autonomous vehicle 200 is in use and navigating the physical environment 104.

In various embodiments, the autonomous vehicle 200 may include a visual indicator system 242 that may be housed in the chassis 202 and/or provided on the chassis 202 and that may be the visual indicator system 120a, 120b, 120c, and 120d of FIG. 1. The visual indicator system 242 may include the visual indicator 240 that may include a lidar device, a headlight, a turn signal, brake light. and/or any additional lighting apparatus mounted to the chassis 202. The visual indicator 240 may be configured to generate 100-1,000,000 lumens of light, such as full spectrum of visible light, a partial spectrum of visible light, and/or is adjustable based on the amount of sunlight illuminating the physical environment 104 such that the light generated by the visual indicator 240 may be distinguishable from the illumination of the physical environment 104 by the sun (e.g., partial or full sun) and/or some artificial lighting in cases where the physical environment 104 is indoors. However, one of skilled in the art in possession of the present disclosures will recognize that other quantities of light and/or spectrums of light may be contemplated and fall within the scope of the present disclosure. For example, infrared (IR) and ultraviolet (UV) light sources at various power levels can also be utilized for machine-to-machine communication. For example, UV sources can be used for fully passive observance of behavior with non-autonomous actors utilizing unique properties of reflection and refraction versus other light spectra. Additionally, point-to-point UV communications systems have been recently demonstrated to achieve very high transmission rates (up to 71 Mbit at incident angles up to 12 degrees).

In an embodiment, if the visual indicator 240 includes a plurality of lights, the lights may be provided in different arrangements (e.g., a circular arrangement, a linear arrangement, an oval arrangement, a quadrilateral arrangement, and/or any other shaped arrangement that would be apparent to one of skill in the art in possession of the present disclosure. Each of the plurality of lights may be configured to independently activate and/or deactivate such that various visual indications (e.g., light patterns/light waves) may be provided by the visual indicator 240 by activating and deactivating particular lights.

The visual indicator system 242 may also include the sensor system 236 or a portion of the sensor system 236 that includes an imaging sensor system and/or a light detector for detecting light waves from visual indicators and decode a light wave signature from the light wave from visual indications generated by other visual indicator systems within the physical environment 104, as discussed in more detail below. The visual indicator system 242 may also include the communication system 206, the autonomous vehicle storage system 214 for storing visual indicator profiles that include the light wave signatures associated with instructions, rules and/or conditions, the autonomous vehicle controller 204 for processing visual indications received and/or providing visual indications via the visual indicator 240 based decisions made by the autonomous vehicle controller, and/or various ECUs for controlling the visual indicators.

Figure 3:
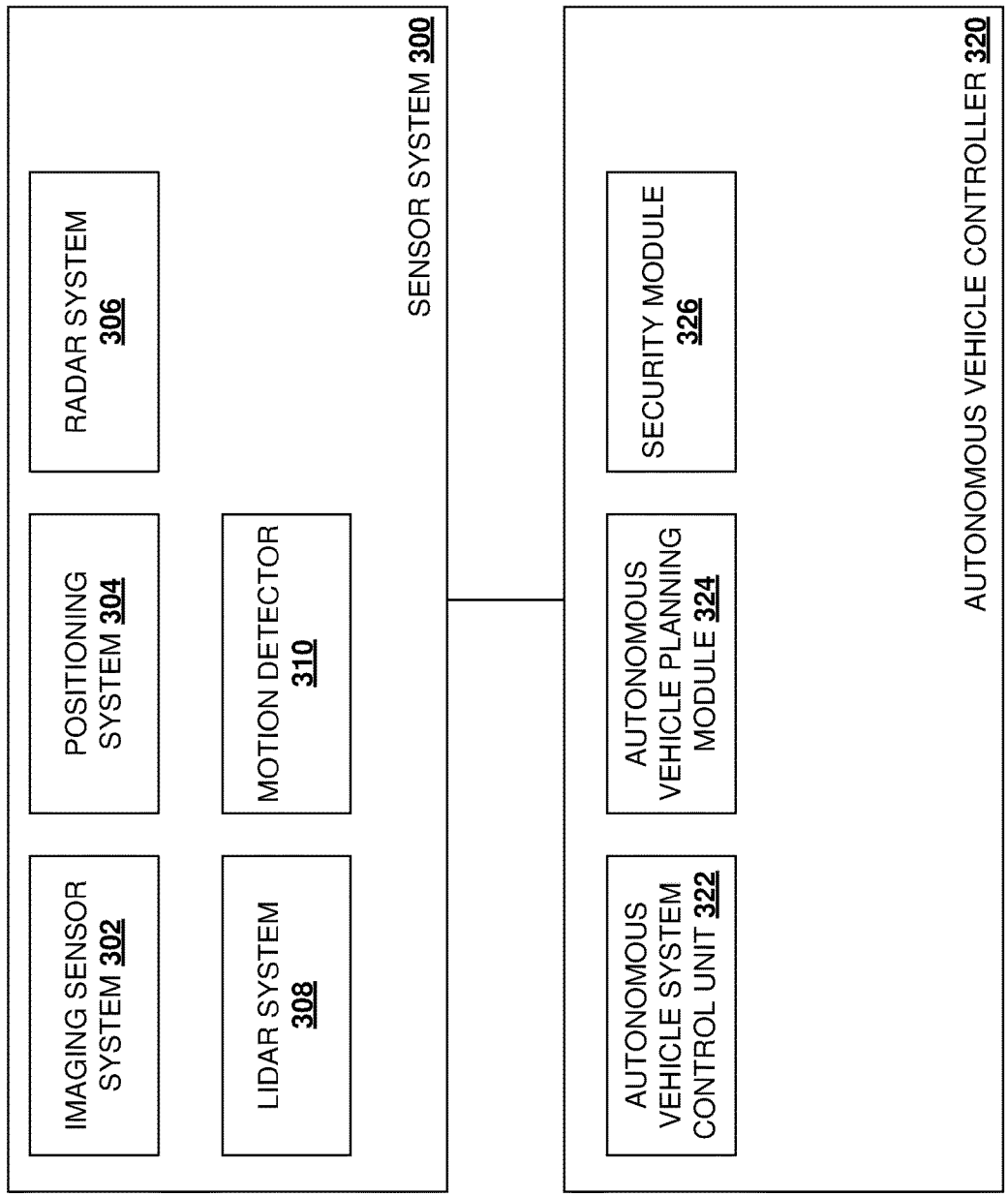
FIG. 3 is a schematic view illustrating an embodiment of a sensor system and an autonomous vehicle controller of the autonomous vehicle of FIG. 2.

Referring to FIG. 3, a sensor system 300 is illustrated that may be the sensor system 236 of FIG. 2. The sensor system 300 may include an imaging sensor system 302, a positioning system 304, a radar system 306, a lidar system 308, a motion detector 310, and/or any other sensors that would be apparent to one of skill in the art in possession of the present disclosure used for autonomously navigating the autonomous vehicle 200 through the physical environment 104 and/or operating the autonomous vehicle 200. In various embodiments, the imaging sensor system 302 may include a plurality of imaging sensors that are provided on various locations of the chassis 202. For example, the imaging sensors may include, a two-dimensional image capturing camera, a three-dimensional image capturing camera, an infrared image capturing camera, a depth capturing camera, similar video recorders, and/or a variety of other image capturing devices. The imaging sensors may also include photodetectors that may be used to gather visual indications from the physical environment 104. The imaging sensor system 302 may be used to gather visual information from the physical environment 104 surrounding the autonomous vehicle 200, for use in recognizing an actor (e.g., the merchant location 106a, the merchant location 106b, the RSE 108, and/or the non-autonomous vehicle 102b) in the physical environment 104, and other functionality with the autonomous vehicle 200. In various examples, the imaging sensor may be mechanically movable, for example, by mounting the camera on a rotating and/or tilting platform.

The sensor system 300 may also include the positioning system 304 that is coupled to the autonomous vehicle controller 204. The positioning system 304 may include sensors for determining the location and position of the autonomous vehicle 200 in the physical environment 104. For example, the positioning system 304 may include a global positioning system (GPS) receiver, a real-time kinematic (RTK) GPS receiver, a differential GPS receiver, a Wi-Fi based positioning system (WPS) receiver, an accelerometer, and/or other positioning systems and components.

The sensor system 300 may include a radar system 306 which may represent a system that utilizes radio signals to sense objects within the physical environment 104 of the autonomous vehicle 200. In some embodiments, in addition to sensing actors, the radar system 306 may additionally sense the speed and/or heading of the actors.

The sensor system 300 may include the lidar system 308, the lidar system 308 may include a light generator, for example, a laser device (e.g., a laser used in lidar), a laser scanner, a flash device (e.g., a flash LED, an electronic flash, etc.), and/or any other light generator for use in lidar and/or photogrammetry applications that would be apparent to one of skill in the art in possession of the present disclosure. The lidar system 308 may include an imaging sensor or light detector in capturing the light from the light generator that is reflected from actors (e.g., the merchant location 106a, the merchant location 106b, the RSE 108, and/or the non-autonomous vehicle 102b) in the physical environment 104. For example, the lidar system 308 may utilize any of the imaging sensors in the imaging sensor system 302 or include its own imaging sensor (e.g., camera).

The sensor system 300 may also include a motion detector 310. The motion detector 310 may include an accelerometer, a gyroscope, and/or any other sensor for detecting and/or calculating the orientation and/or movement of the autonomous vehicle 200.

The sensor system 300 may further include other sensors, such as, a lighting sensor (to detect and decode wave signatures in light waves as described herein), a sonar sensor, an infrared sensor, an ultraviolet sensor, a steering sensor, a throttle sensor, a braking sensor, and an audio sensor (e.g., a microphone). An audio sensor may be configured to capture sound from the physical environment 104 surrounding the autonomous vehicle 200. A steering sensor may be configured to sense the steering angle of a steering wheel, wheels 222 of the autonomous vehicle 200, or a combination thereof. A throttle sensor and a braking sensor may sense the throttle position and braking position of the autonomous vehicle 200, respectively. In some situations, a throttle sensor and a braking sensor may be integrated as an integrated throttle/braking sensor.

FIG. 3 also illustrates an autonomous vehicle controller 320 coupled to the sensor system 300 and that may be the autonomous vehicle controller 204 of FIG. 2. The autonomous vehicle controller 320 may include an autonomous vehicle system control unit 322 that includes modules that control and interact with the various systems of the autonomous vehicle 200. For example, autonomous vehicle system control unit 322 may communicate via the bus 212 via the various ECUs 216. In one embodiment, the autonomous vehicle system control unit 322 includes, but is not limited to, a steering unit, a throttle unit (also referred to as an acceleration unit), a braking unit, a visual indicator module, a transmission unit, and/or any other autonomous vehicle system unit that would be apparent one of skill in the art in possession of the present disclosure. For example, the autonomous vehicle system control unit 322 may be configured to communicate with respective ECUs for the brake system, the throttle system, the steering system, the visual indicator system and/or other systems of the autonomous vehicle. For example, the steering unit may adjust the direction or heading of the autonomous vehicle 200. The throttle unit may control the speed of the motor 226 or engine that in turn controls the speed and acceleration of the autonomous vehicle 200. The braking unit may control the braking system 232 to decelerate the autonomous vehicle 200 by providing friction to slow the wheels 222 or tires of the autonomous vehicle. The steering unit may turn the wheels 222 or tires of the autonomous vehicle 200. Accordingly, a driving maneuver may include any driving actions performed by the autonomous vehicle 200, for example, by using one, or a combination, of the steering unit, the throttle unit, and the braking unit. In another embodiment, the available modes for the ECUs may be modified after receiving signals from the autonomous vehicle control unit 322.

The autonomous vehicle controller 320 may also include autonomous vehicle planning module 324. The autonomous vehicle planning module 324 may include a plurality of modules for perceiving the physical environment 104 and planning a route through the physical environment 104 according to instructions received by a user or externally provided data subsystem application. For example, the autonomous vehicle planning module 324 may manage environmental information such as localization data related to a trip or route of the user or application of the autonomous vehicle 200, such as for example a map, location information, route information, traffic information and other localization information.

Based on the sensor data provided by the sensor system 300 and environmental information obtained by localization module, a perception of the physical environment 104 is determined by the autonomous vehicle planning module 324. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, a crosswalk, or other traffic related signs (e.g., stop signs, yield signs), visual indications coming from visual indicator systems within the physical environment, and/or other perceptions that would be apparent to one of skill in the art in possession of the present disclosure. The autonomous vehicle planning module 324 may include a computer vision system or functionalities of a computer vision system to process and analyze images captured by one or more imaging sensors of the imaging sensor system 302 in order to identify objects, actors, and/or features in the physical environment 104 of autonomous vehicle 200. The actors may include the actors (e.g., the merchant location 106*a*, the merchant location 106*b*, the RSE 108, and/or the non-autonomous vehicle 102*b*) described above. The computer vision system may use an actor recognition algorithm, video tracking, and other computer vision techniques. In some embodiments, the computer vision system can map an environment, track actors, and estimate the speed of actors, etc. The autonomous vehicle planning module 324 can also detect actors based on other sensor data provided by other sensors such as the radar system 306 and/or the lidar system 308 or by the visual indicator 240 provided by a visual indication system 242, which may provide a more instantaneous information about the actors within the physical environment 104 such as whether they are accelerating or decelerating, which direction they are about to move, and/or other actor intent information that would be apparent to one of skill in the art in possession of the present disclosure. The visual indications may provide more timely information to the autonomous vehicle 200 and/or may be more discernable than imaging the actor within the physical environment 104.

For each of the actors, autonomous vehicle planning module 324 decides how to handle the actor for a specific situation. For example, for a particular actor (e.g., another vehicle in a crossing route) as well as its metadata describing the actor (e.g., a speed, direction, turning angle), which may include translations of the visible indications received from visible indicator systems within the physical environment to metadata describing the actor, the autonomous vehicle planning module 324 decides how to encounter the actor (e.g., overtake, yield, stop, pass). The autonomous vehicle planning module 324 may make such decisions according to a set of rules such as traffic rules, which may be stored in the autonomous vehicle storage system 214. Based on a decision for each of the actors perceived, the autonomous vehicle planning module 324 plans a path or route for the autonomous vehicle 200, as well as driving parameters (e.g., distance, speed, and/or turning angle). That is, for a given actor, the autonomous vehicle planning module 324 decides an action to take based on the actor and how to take the action. The autonomous vehicle planning module 324 generates planning and control data including information describing how the autonomous vehicle 200 would move in a next interval. The planning and control data are fed by the autonomous vehicle planning module 324 to the autonomous vehicle system control unit 322 that controls and drives the autonomous vehicle 200 by sending proper commands or signals to the autonomous vehicle system control unit 322, according to a route or path defined by the planning and control data. The planning and control data include sufficient information to drive the autonomous vehicle 200 from a first point to a second point of a route or path. While a specific autonomous vehicle 200, sensor system 300, and autonomous vehicle controller 320 have been illustrated and described, one of skill in the art in possession of the present disclosure will recognize that the teachings of the present disclosure will be beneficial for a variety of autonomous vehicles, sensor systems, and autonomous vehicle controllers that would be apparent to one of skill in the art in possession of the present disclosure and, as such, a wide variety of modifications to the number, types, and orientation of devices and modules in the autonomous vehicle 200, the sensor system 300, and the autonomous vehicle controller 320 will fall within the scope of the present disclosure as well.

Figure 4:
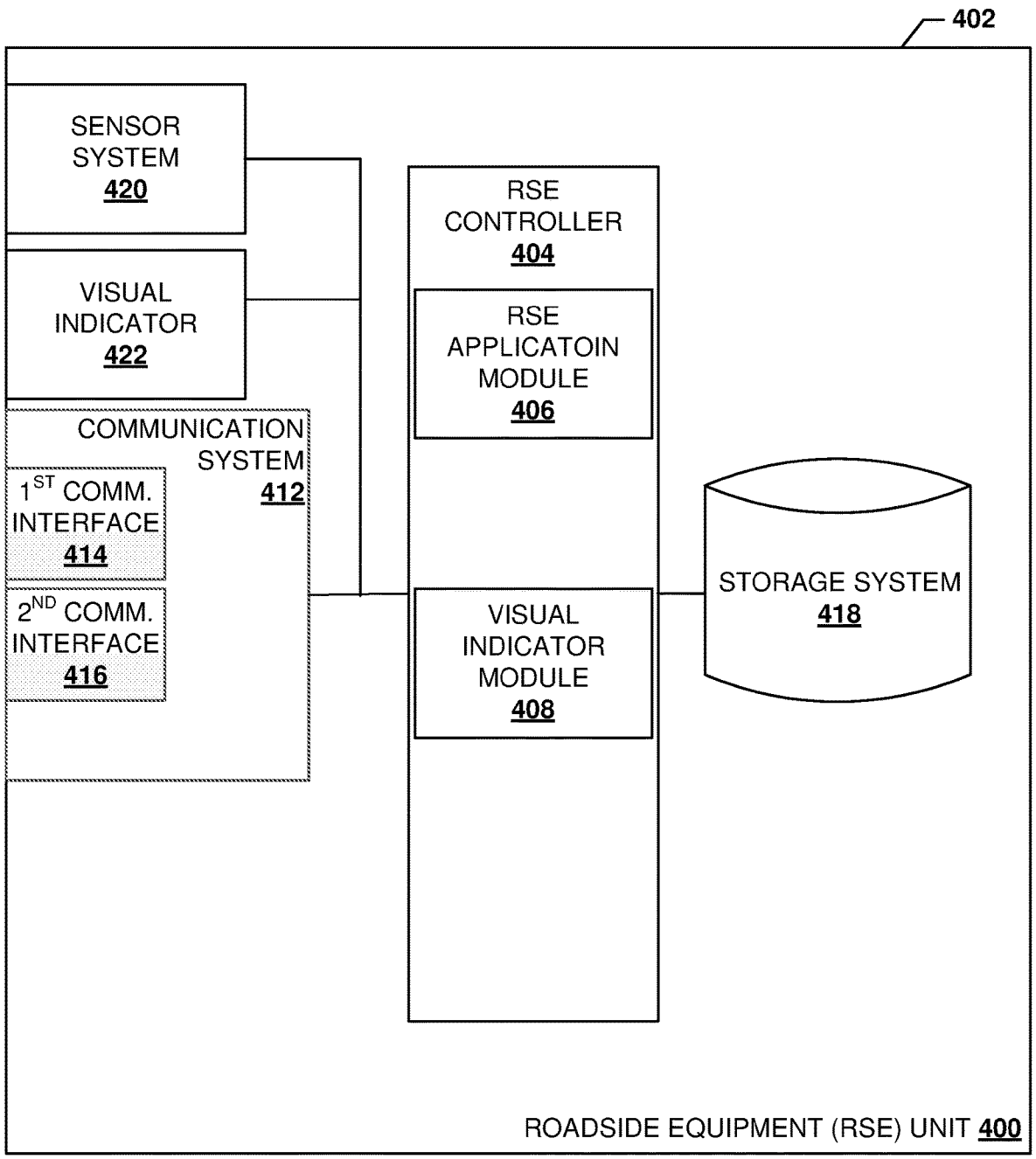
FIG. 4 is a schematic view illustrating an embodiment of a roadside equipment (RSE) unit used in the proximity-based token issuance system of FIG. 1.

Referring now to FIG. 4, an embodiment of a roadside equipment (RSE) unit 400 is illustrated that may be the RSE unit 108 discussed above with reference to FIG. 1. In the illustrated embodiment, the RSE unit 400 includes a chassis 402 that houses the components of the RSE unit 400. Several of these components are illustrated in FIG. 4. For example, the chassis 402 may house a processing system (not illustrated) and a non-transitory memory system (not illustrated) that includes instructions that, when executed by the processing system, cause the processing system to provide an RSE controller 404 that is configured to perform the functions of the RSE controllers and/or the autonomous vehicles discussed below. In the specific example illustrated in FIG. 4, the RSE controller 404 is configured to provide an RSE application module 406 to perform specific functions of the RSE unit 400. For example, if the RSE unit 400 is a traffic light, the RSE application module 406 may include instructions to operate the signals of the traffic light. However, in other embodiments, the RSE unit 400 may be dedicated for facilitating autonomous vehicle traffic, as such the RSE application module 406 may be configured to generate and provide the specific autonomous vehicle instructions to the autonomous vehicles 102a in the physical environment 104. In other specific examples, the RSE unit 400 may be a railroad crossing gate and the RSE application module 406 may execute instructions to operate the railroad crossing gate (e.g., raising and lowering). In yet another example, the RSE unit 400 may be dedicated to the proximity-based token issuance system 100 to assist in the performance of proximity-based token issuance. The RSE controller 404 may also include a visual indicator module 408 that may operate similar to the visual indicator module of the autonomous vehicle system control unit 322 discussed above in FIG. 3. As such, the visual indicator module 408 may generate visual indications via a visual indicator 422 based on environmental information generated by a sensor system. The visual indicator module 408 may also be configured to process visual indications received from other autonomous vehicles and/or other actors in the physical environment 104.

The chassis 402 may further house a communication system 412 that is coupled to the RSE controller 404 (e.g., via a coupling between the communication system 412 and the processing system). The communication system 412 may include software or instructions that are stored on a computer-readable medium and that allow the RSE unit 400 to send and receive information through the communication networks discussed above. For example, the communication system 412 may include a first communication interface 414 to provide for communications through the network 112 as detailed above (e.g., first (e.g., long-range) transceiver(s)). In an embodiment, the first communication interface 414 may be a wireless antenna that is configured to provide communications with IEEE 802.11 protocols (Wi-Fi), cellular communications, satellite communications, other microwave radio communications and/or communications. The communication system 412 may also include a second communication interface 416 that is configured to provide direct communication with the autonomous vehicle 102a, other RSE units, and/or other devices within the physical environment 104 discussed above with respect to FIG. 1 (e.g., second (e.g., short-range) transceiver(s)). For example, the second communication interface 416 may be configured to operate according to wireless protocols such as Bluetooth®, Bluetooth® Low Energy (BLE), near field communication (NFC), infrared data association (IrDA), ANT®, Zigbee®, Z-Wave® IEEE 802.11 protocols (Wi-Fi), and other wireless communication protocols that allow for direct communication between devices.

The chassis 402 may also house a storage system 418 that is coupled to the RSE controller 404 through the processing system. The storage system 418 may store sensor data, autonomous vehicle instructions, visual indicator profiles that include visual indications associated with instructions, conditions, and/or translations that would be apparent to one of skill in the art in possession of the present disclosure.

In various embodiments, the RSE unit 400 may include a sensor system 420 that may be housed in the chassis 402 and/or provided on the chassis 402. The sensor system 420 may be coupled to the RSE controller 404 via the processing system. The sensor system 420 may include one or more sensors that gather sensor data about the RSE unit 400 and/or physical environment 104 that may be provided to the RSE controller 404 and more specifically to the visual indicator module 408. The sensor data may be used by the visual indicator module 408 to generate visual indications via the visual indicator 422. In various embodiments, the sensor system 420 may include the sensor system 300 of FIG. 3.

The chassis 402 may also house the visual indicator 422 or the visual indicator 422 may be partially provided on the chassis 402 to provide a direct line-of-sight with the physical environment 104. The visual indicator 422 may include one or more lights (e.g., light-emitting diodes (LEDs), halogen bulbs, fluorescent bulbs, incandescent bulbs, lasers, and/or other light generating devices) that are configured to generate 100-1,000,000 lumens of light, such as the full spectrum of visible light, a partial spectrum of visible light, and/or are configured to provide adjustable illumination based on the amount of sunlight illuminating the physical environment 104 such that the light generated by the visual indicator 422 may be distinguishable from the illumination of the physical environment 104 by the sun (e.g., partial or full sun) and/or some artificial lighting in cases where the physical environment 104 is indoors. In other embodiments, the visual indicator 422 may include an infrared (IR) source and/or an ultraviolet (UV) light source at various power levels that can also be utilized for machine-to-machine communication. For example, UV sources can be used for fully passive observance of behavior with non-autonomous actors utilizing unique properties of reflection and refraction versus other light spectra. Additionally, point-to-point UV communications systems have been recently demonstrated to achieve very high transmission rates (up to 71 Mbit at incident angles up to 12 degrees).

If the visual indicator 422 includes a plurality of lights, the lights may be provided in different arrangements (e.g., a circular arrangement, a linear arrangement, an oval arrangement, a quadrilateral arrangement, and/or any other shaped arrangement that would be apparent to one of skill in the art in possession of the present disclosure). Each of the plurality of lights may be configured to independently activate and/or deactivate such that various visual indications may be provided by the visual indicator 422 by activating and deactivating particular lights. While an RSE unit 400 has been illustrated and described, one of skill in the art in possession of the present disclosure will recognize that the teachings of the present disclosure will be beneficial for a variety of RSE units and, as such, a wide variety of modifications to the number, types, and orientation of devices and modules in the RSE unit 400 will fall within the scope of the present disclosure as well.

Figure 5:
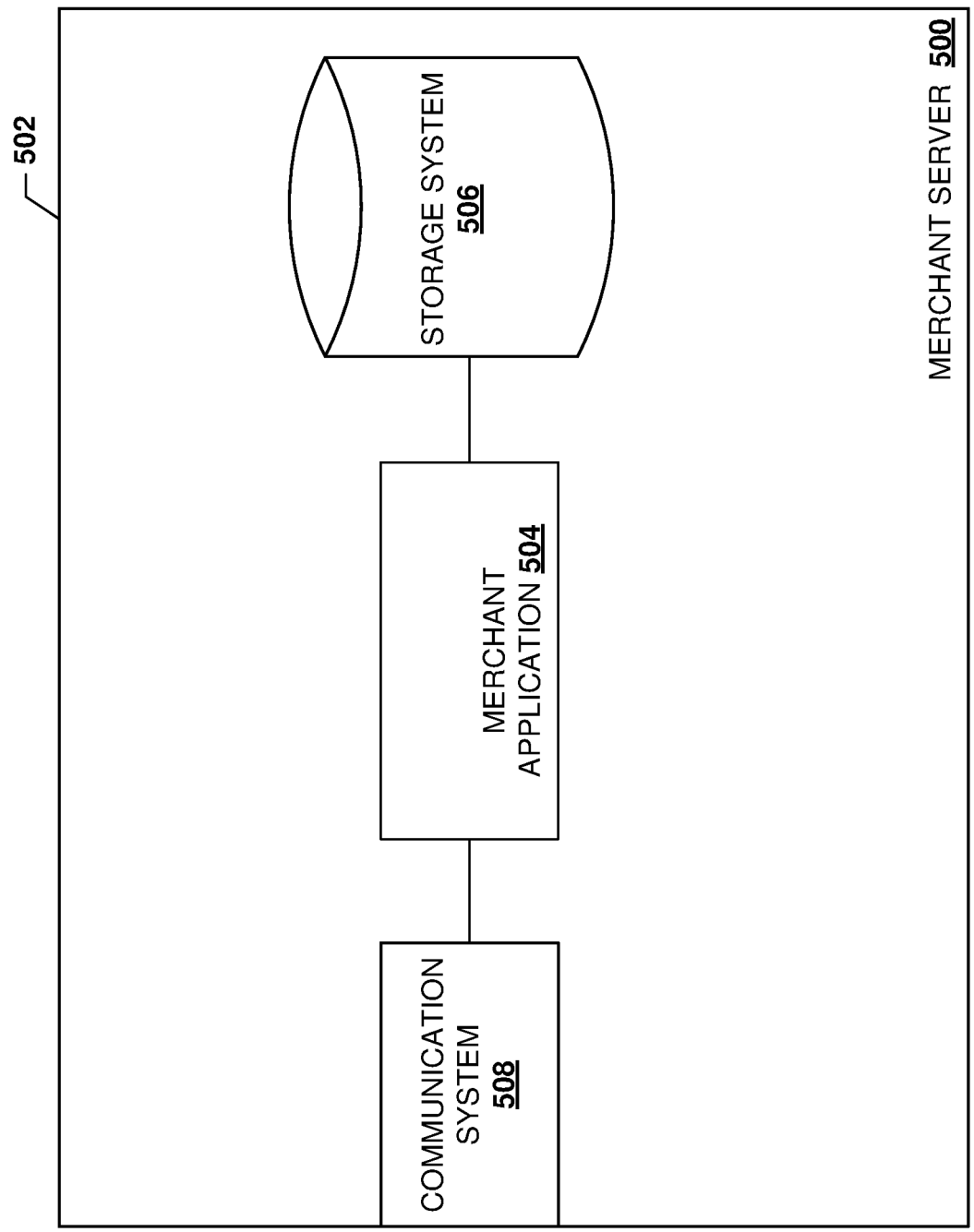
FIG. 5 is a schematic view illustrating an embodiment of a merchant server used in the proximity-based token issuance system of FIG. 1.

Referring now to FIG. 5, an embodiment of a merchant server 500 is illustrated that may represent the merchant servers 111a and 111b for the merchant associated with the merchant location 106a and the merchant associated with the merchant location 106b discussed above with reference to FIG. 1. As such, the merchant server may be implemented as server computing devices, desktop computing devices, laptop/notebook computing devices, tablet computing devices, mobile phones, and/or other computing devices known in the art. Furthermore, while illustrated and discussed as being implemented by particular computing devices, one of skill in the art in possession of the present disclosure will recognize that the functionality of the merchant server 500 discussed below may be implemented by other devices that are configured to operate similarly as the merchant server 500 discussed below. In the illustrated embodiment, the merchant server 500 includes a chassis 502 that houses the components of the merchant server 500, only some of which are illustrated below. For example, the chassis 502 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a merchant application module 504 that is configured to perform the functionality of the merchant application modules and/or computing devices discussed below.

The chassis 502 may also house a storage system that is coupled to the merchant application module 504 (e.g., via a coupling between the storage system and the processing system) and that includes a merchant database 506 that is configured to store any of the information utilized by the merchant application module 504 discussed below. The chassis 502 may also house a communication system 508 that is coupled to the merchant application module 504 (e.g., via a coupling between the communication system 508 and the processing system) and that may be provided by a Network Interface Controller (NIC), wireless communication systems (e.g., BLUETOOTH®, Near Field Communication (NFC) components, Wi-Fi components, etc.), and/or any other communication components that would be apparent to one of skill in the art in possession of the present disclosure. However, while a specific merchant server 500 has been illustrated, one of skill in the art in possession of the present disclosure will recognize that computing devices (or other devices operating according to the teachings of the present disclosure in a manner similar to that described below for the merchant server 500) may include a variety of components and/or component configurations for providing conventional merchant server functionality, as well as the functionality discussed below, while remaining within the scope of the present disclosure as well.

Figure 6:
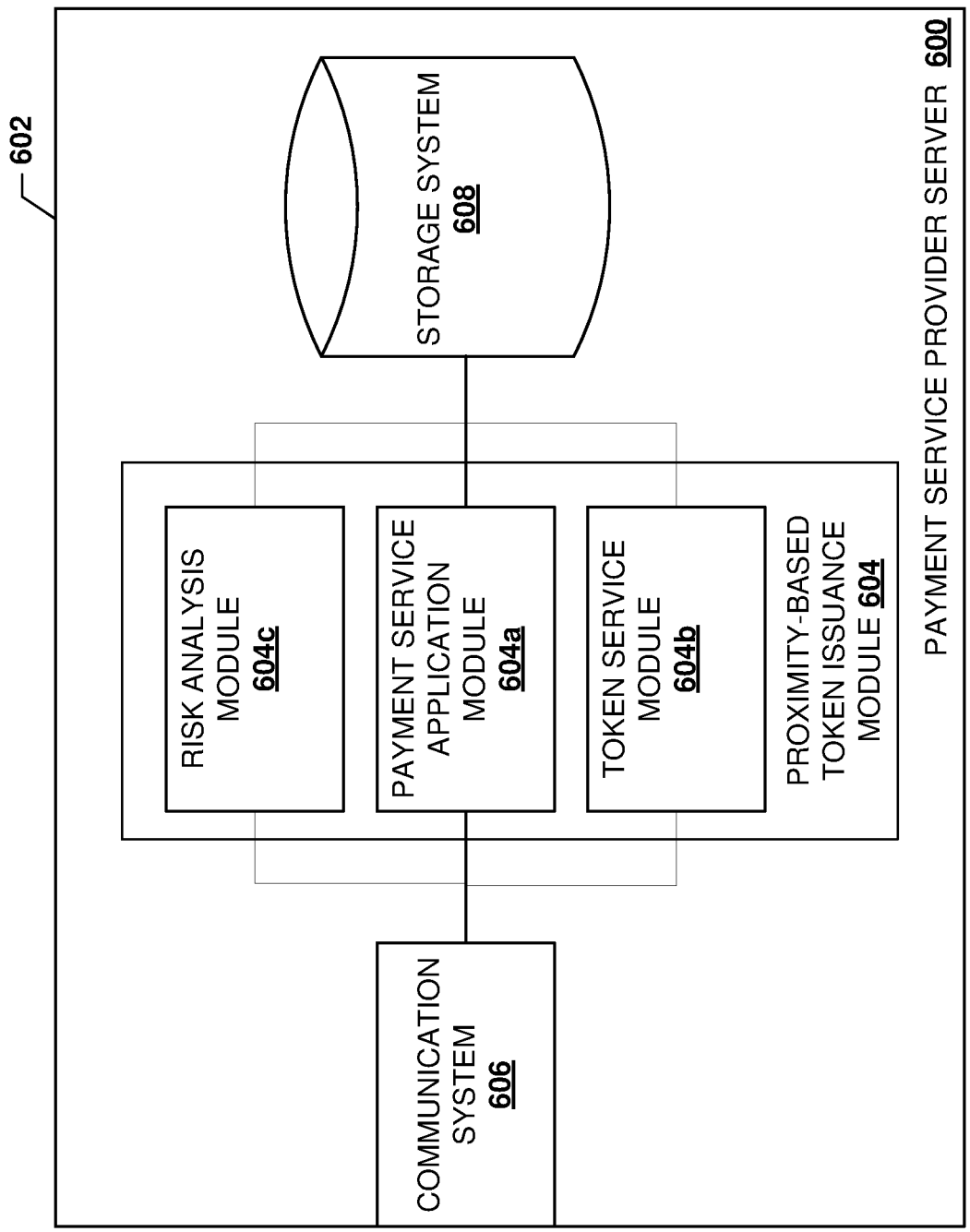
FIG. 6 is a schematic view illustrating an embodiment of a payment service provider server used in the proximity-based token issuance system of FIG. 1.

Referring now to FIG. 6, an embodiment of a payment service provider server 600 is illustrated that may be the payment service provider server 110 discussed above with reference to FIG. 1. In various embodiments, the payment service provider server 600 includes one or more servers associated with a payment service provider (e.g., VENMO®, Inc. of San Jose, CA or PAYPAL®, Inc. of San Jose, CA) that processes payments for users completing purchase transactions, generates and issues payment tokens for completing the purchase requests, and provides risk analysis, however other servers that provide other services are contemplated as well. In the illustrated embodiment, the payment service provider server 600 includes a chassis 602 that houses the components of the payment service provider server 600, only some of which are illustrated in FIG. 6. For example, the chassis 602 may house a processing system (not illustrated) and a non-transitory memory system (not illustrated) that includes instructions that, when executed by the processing system, cause the processing system to provide a proximity-based token issuance module 604 that is configured to perform the functions of the proximity-based token issuance modules and/or payment service provider servers discussed below. In the specific example illustrated in FIG. 6, the proximity-based token issuance module 604 is configured as a proximity-based token issuance service to provide a token to a merchant to complete a purchase request between the merchant and the user based on proximity of a user device (e.g., the autonomous vehicle 102a/200) associated with the user to a merchant location (e.g., merchant locations 106a and/or 106b). For example, the proximity-based token issuance module 604 may include a payment service application module 604a that is configured to provide a payment service application interface and process payment requests between a user of the payment service and merchants as well as the functionality discussed below. The proximity-based token issuance module 604 may include a token service module 604b that is configured to generate and provide tokens for completing a purchase request. In some embodiments, the proximity-based token issuance module 604 may include risk analysis module 604c that may be configured to provide risk analysis for a payment transaction based on information obtained from the physical environment 104 of FIG. 1. However, one of skill in the art in possession of the present disclosure will recognize that the proximity-based token issuance module 604 may provide any number of services from various service providers for completing a payment transaction and providing proximity-based token issuance.

The chassis 602 may further house a communication system 606 that is coupled to the proximity-based token issuance module 604 (e.g., via a coupling between the communication system 606 and the processing system) and that is configured to provide for communication through the networks 112 and/or 113 as detailed below. The communication system 606 may allow the payment service provider server 600 to send and receive information over the network 112 of FIG. 1. The chassis 602 may also house a storage device (not illustrated) that provides a storage system 608 (e.g., the payment token database 118) that is coupled to the proximity-based token issuance module 604 through the processing system. The storage system 608 may be configured to store authentication credentials, cryptographic keys and/or certificates used to authenticate communication within the proximity-based token issuance system 100, user accounts, payment tokens to complete purchase requests, risk analysis rules and instructions, proximity-based token issuance rules and instructions, and/or any other information/instructions that would be apparent to one of skill in the art in possession of the present disclosure. While a specific payment service provider server 600 has been illustrated and described, one of skill in the art in possession of the present disclosure will recognize that the teachings of the present disclosure will be beneficial for a variety of server devices that would be apparent to one of skill in the art in possession of the present disclosure and, as such, a wide variety of modifications to the number, types, and orientation of devices and modules in the payment service provider server 600 will fall within the scope of the present disclosure as well.

Figure 7:
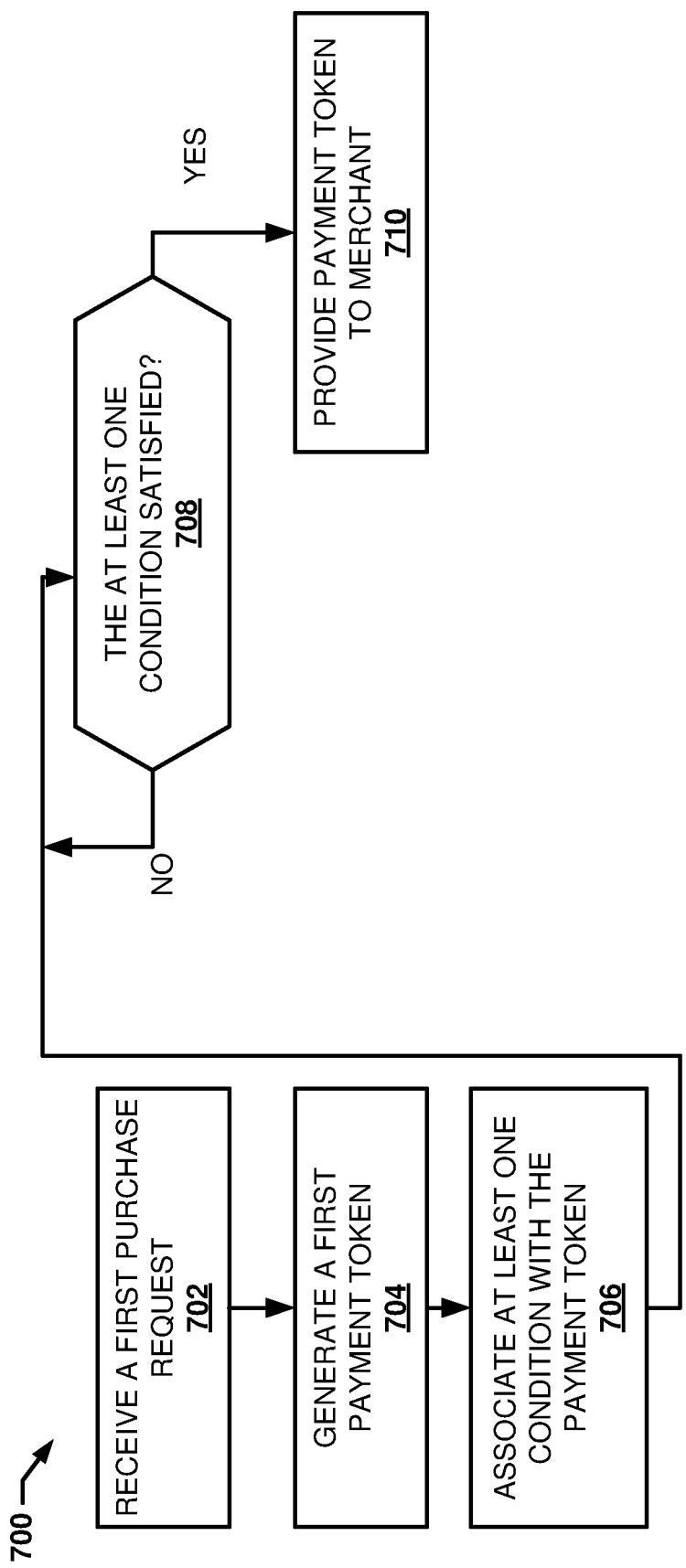
FIG. 7 is a flow chart illustrating an embodiment of a method of proximity-based token issuance.

Referring now to FIG. 7, an embodiment of a method 700 of proximity-based token issuance is illustrated. The method 700 will be discussed in reference to the figures discussed above. The method 700 begins at block 702 where a first purchase request for at least one of a first good or a first service from a first merchant at a first merchant location is received. In an embodiment, at block 702 and from the perspective of the payment service provider server 110, the payment service provider server 110 may receive a first purchase request from the merchant server 111a. Prior to block 702, the user of the autonomous vehicle 102a may have interacted with the merchant via a merchant application provided by the merchant server 111a and that is associated with the merchant location 106a. The user may have made the interaction with the merchant application via the user interface system 218 of the autonomous vehicle 102a and/or via a user interface on any other user device (e.g., a smartphone or tablet). However, in other embodiments, the user may have interacted with the merchant via an "offline" communication route such as through a phone call. The user may have, via the merchant application associated with the merchant server 111a, selected a good and/or service to purchase from the merchant. As part of the transaction between the user and the merchant, the user may have indicated that that user is going to receive the good and/or service at the merchant location 106a. In a specific example, the user purchased a pizza via a restaurant's mobile application/web application and the user is going to pick the pizza up at the restaurant location associated with the merchant location 106a. To complete the transaction, the user may have indicated, via the merchant application, that the user would like to pay for the transaction using the payment service provider associated with the payment service provider server 110.

When the user completes the transaction, via the merchant application on the merchant server 111a and associated with the merchant location 106a and/or via some inputs via a merchant terminal by a merchant associate communicating with user over a voice network, the merchant application provides the first purchase request for the at least one of the first good or the first service from the first merchant at the first merchant location to the payment service provider server 110. To complete the first purchase request, the payment service provider server 110, as appreciated by one of skill in the art in possession of the present disclosure, may provide a payment token to the merchant server 111a such that the merchant server 111a can pass the payment token with a charge request via a network to a funding instrument source, which may then charge a transaction amount of the purchase request to that funding instrument source. As such, one of skill in the art in possession of the present disclosure will recognize that to complete the purchase request and provide payment to the merchant, one or more non-transactable and/or transactable tokens may be used to complete the purchase request and to fund the purchase request using various token schemes.

The method 700 then proceeds to block 704, where the first payment token is generated based on the first purchase request. In an embodiment, at block 704, the payment service provider server 110 may generate or cause to generate the first payment token based on the first purchase request. For example, the token service module 604b of the payment service provider server 110 may generate the first payment token. The token service module 604b may include one or more of a token requestor and a token service provider. However, the token requestor and/or the token service provider may be provided by separate entities from the payment service provider that the payment service provider server 110 communicates with over the network 113. The token requestor and the token service provider may communicate information associated with the user and the purchase request to generate the first payment token as would be appreciated by one of skill in the art in possession of the present disclosure.

The method 700 proceeds to block 706 where one or more conditions are associated with the first payment token. In an embodiment, at block 706, the payment service provider server 110, via the proximity-based token issuance module 604, may associate one or more conditions that are required to be satisfied before the first payment token is provided to the merchant server 111a associated with the merchant location 106a. In an embodiment, the proximity-based token issuance module 604 may associate the first payment token with a first proximity condition. The first proximity condition may define a threshold distance that the user is required to be from the merchant location 106a before the first payment token is provided to the merchant server 111a. For example, if the user is within a 400-meter radius (e.g., 400 m or less) from the merchant location 106a, the first proximity condition may be satisfied. If the user is outside of the 400-meter radius from the merchant location 106a, the first proximity condition is not satisfied. However, the first proximity condition may be distance thresholds of other distances (e.g., 5 m, 50 m, 100 m, 700 m, 1 km, 2 km, and/or any other distance) that the user or user device is from the merchant location 106a. In another embodiment, the threshold distance may be based on an estimated arrival time to the location, e.g., if the user is traveling (or expected to travel) at a higher rate of speed, such as due to lighter traffic and/or higher speed limits, the distance may be longer than if the user is traveling (or expected to travel) at a lower rate of speed, such as due to heavier traffic and/or lower speed limits. For example, if the estimated arrival time is 20 minutes from a location 10 km away, the threshold distance maybe less for the same 10 km distance but having an expected arrival time of 10 minutes.

In an embodiment, the proximity-based token issuance module 604 may associate the first payment token with a risk condition. In an embodiment, the risk condition may define a risk score and/or a risk notification (e.g., a notification that indicates whether the first payment request is likely or not likely subject to fraud).

In an embodiment, the proximity-based token issuance module 604 may associate the first payment token with a first light wave signature. The storage system 608 may include light wave signatures associated with the autonomous vehicle 102a that associated with the user account of the user associated with the first purchase request. For example, the storage system may include a light wave signature associated with a light generator such as, for example, the lidar system 308 and/or the visual indicator 240 associated with the autonomous vehicle 102a. In various embodiments, the first light wave signature may be based on standard light waves generated by the visual indicator 240 and/or the lidar system 308 during those systems' standard operations. In other embodiments, the light wave signature may be based on instructions provided to the visual indicator 240 and/or the lidar system 308 by the payment service provider server 110 to the autonomous vehicle 102a such that the visual indicator 240 and/or the lidar system 308 generates the light wave signature. The various conditions, data, and/or instructions associated with the payment token may be stored with the payment token in the payment token database 118. While specific conditions being associate with the payment token are described, one of skill in the art in possession of the present disclosure will recognize that other conditions, data, and/or instructions may be associated with the payment token and still fall under the scope of the present disclosure.

The method 700 may then proceed to decision block 708 where it is determined whether the one or more conditions associated with the first payment token are satisfied. In an embodiment, at decision block 708, the payment service provider server 110, via the proximity-based token issuance module 604, may determine whether one or more of the conditions associated with the first payment token are satisfied. In an embodiment, the proximity-based token issuance module 604 may determine whether the first proximity condition is satisfied. The proximity-based token issuance module 604 may receive from any of the devices in the physical environment 104 location information for the autonomous vehicle 102a. For example, the autonomous vehicle 102a may provide, via the network 112 to the payment service provider server 110, location information. The location information may include, for example, coordinates of the autonomous vehicle 102a within the physical environment 104 determined by the positioning system 304 included in the autonomous vehicle 102a, a distance from the merchant location 106a determined by the radar system 306, lidar system 308, and/or the imaging sensor system 302, and/or any other location information determination method that would be apparent to one of skill in the art in possession of the present disclosure. For example, the autonomous vehicle 102a may determine a distance from the merchant location 106a by using object recognition in combination with images obtain of the physical environment 104 by the imaging sensor system 302 to determine that the merchant location 106a is within a field of view. Using the lidar system and/or the radar system 306, the autonomous vehicle 102a may determine a distance that the autonomous vehicle 102a is currently located from that merchant location 106a.

In other embodiments, the RSE 108 may provide location information of the autonomous vehicle 102a to the payment service provider server 110. The RSE 108 may determine location information (e.g., coordinates, distance, etc.) of the autonomous vehicle 102a using triangulation techniques based on communications and/or light waves received from the autonomous vehicle 102a. The RSE 108 may be able to triangulate the location of the autonomous vehicle independently or in combination with information provided by other RSEs within the physical environment 104. In other examples, the network 112 may be configured to determine the location information of the autonomous vehicle 102a via triangulation techniques. In yet other embodiments, the merchant location 106a and/or 106b may determine the location information of the autonomous vehicle 102a by, for example, utilizing a similar lidar system or radar system to that included in the autonomous vehicle 102a as would be appreciated by one of skill in the art in possession of the present disclosure. While specific examples of providing location information of a user and that user's user device (e.g., the autonomous vehicle 102a) have been described, one of skill in the art in possession of the present disclosure will recognize that other location determination techniques may be contemplated and still fall under the scope of the present disclosure.

When the payment service provider server 110 receives the location information, the location information may include the distance of the autonomous vehicle 102a from the merchant location 106a and/or a coordinate of the autonomous vehicle 102a that identifies the location of the autonomous vehicle 102a in the physical environment from which a distance can be determined to a stored coordinate of the merchant location 106a or a coordinate of the merchant location 106a received from the merchant server 111a when that merchant server 111a requests the payment token.

The payment service provider server 110 may then determine whether the distance between the merchant location 106a and the autonomous vehicle 102a satisfies the first proximity condition or does not satisfy the first proximity condition. For example, the proximity-based token issuance module 604 may compare the distance to a distance threshold and if the distance is less than or equal to the distance threshold, the distance satisfies the first proximity condition and if the distance is greater than the distance threshold, then the distance does not satisfy the first proximity condition. However, one of skill in the art in possession of the present disclosure will recognize that other proximity conditions, such as time to arrival, may be considered and still fall under the scope of the present disclosure.

In an embodiment, at decision block 708, the proximity-based token issuance module 604 may determine whether a first risk condition is satisfied. The first risk condition may be determined in addition to the first proximity condition or alternatively to the first proximity condition. For example, in one embodiment, payment service provider server 110 provides the risk analysis module 604c user data and/or other data as inputs to a scoring model. This scoring model may be implemented with executable code by proximity-based token issuance module 604 and/or another system and may be a risk scoring model that evaluates risk for a current and/or future payment transaction associated with the user account of the user of the autonomous vehicle 102a. The data provided to the risk analysis module 604c may include a wide variety of data. In some embodiments, a great deal of data may be provided to the scoring model in included in the risk analysis module. For example, the data may include prior electronic payment transactions of the user, a home address, network information (IP address, connectivity, latency, and/or other networking information about the network 112 in the physical environment 104), device information (display, font settings information, browser information, velocity, biometric data of the occupant of the autonomous vehicle 102a and/or any other information that would be apparent to one of skill in the art in possession of the present disclosure) of the autonomous vehicle 102a and/or other user devices associated with the user, physical environment data of the physical environment 104 (temperature, images, actor information of actors in the physical environment 104, weather conditions, and/or any other physical environment data) captured by sensors provided by the merchant location 106a, the merchant location 106b, the non-autonomous vehicle 102b, and/or the RSE 108 and provided to the payment service provider server 110, and/or other information that would be apparent to one of skill in the art in possession of the present disclosure.

Historical baseline data is provided to the scoring model in various embodiments. This data may be based on prior observations for the user, similar users, the physical environment 104, and/or other prior historical data that would be apparent to one of skill in the art in possession of the present disclosure. The historical baseline data may also be normalized across different time periods (e.g., weekends may have different patterns than weekdays, holidays may have higher traffic than normal, etc.). Thus, historical baseline data can be scaled as deemed appropriate before feeding the data into a scoring model.

In an embodiment, the payment service provider server 110 receives an output from the scoring model provided by the risk analysis module 604c based on the provided inputs. This output may be a risk score (e.g., on a scale from 0 to 100) based on many factors. The overall risk score may indicate whether the payment transaction will be approved, partially approved (e.g., at a lower limit than requested), or if an account change transaction will be permitted for example. For example, the risk condition may be a predetermined risk score threshold that the proximity-based token issuance module 604 compares to the risk score. If the higher the risk score is associated with a higher risk, then when the risk score is greater than the predetermined risk score threshold, the payment transaction may be considered risky. If the risk score is less than or equal to the predetermined risk score threshold. In other embodiments, the risk score threshold may change based on other factors. For example and with respect to the first proximity condition, the closer the autonomous vehicle 102a is to the merchant location 106a, the risk condition such as the risk score threshold may change. As such, the closer the autonomous vehicle 102a is to the merchant location 106a, the tolerance for risk may increase. Similarly, if the risk is very low, the first proximity condition may allow for greater distances between the autonomous vehicle 102a and the merchant location 106a for the first proximity condition being satisfied.

In various embodiments, a number of different windows may be used, counters for which may be implemented in a circular array. When providing data to a scoring model such as a risk scoring model that provides a numerical output, multiple window values may be provided in various cases. Thus, the inputs may be received and the risk score may be outputted every second, 10 seconds, 30 second, 1 minute, 5 minutes, every hour, and/or any other periods of time could be provided and used by a risk model.

In an embodiment, at decision block 708, the proximity-based token issuance module 604 may determine whether a first light wave signature is detected. The requirement of a first light wave signature being detected may be in addition to the first proximity condition and/or the first risk condition or alternative to the first proximity condition and the first risk condition. In various embodiments, the autonomous vehicle 102a may be instructed by the payment service provider server 110 to generate light waves via a light generator such as the lidar system 308 and/or the visual indicator system 242. The light waves may be transmitted according to the instructions provided by the payment service provider server 110. However, in other embodiments, the light waves generated by the light generators may include a light wave signature that is unique to that light generator (e.g., because of manufacturer variation, model variation, and the like). Sensors at the RSE 108, the merchant location 106a, the merchant location 106b, the non-autonomous vehicle 102b, and/or any other actors in the physical environment 104 may capture the light waves generated by the autonomous vehicle 102a and provide those captured light waves to the payment service provider server 110. The payment service provider server 110 may computationally process any of the received light waves and determine whether captured light wave(s) correspond with the light wave instructions provided to the autonomous vehicle and associated with the user account and/or purchase transaction. In other embodiments, the payment service provider server 110 may computationally process any of the received light waves and determine whether the captured light waves(s) correspond with a stored light wave signature in the storage system 608 and whether that stored light wave signature is associated with a user or user device that includes a pending purchase transaction that requires issuance of a payment token to a merchant. The light waves may include encoded information such as a user identifier, a user device identifier, a purchase identifier, and/or any other information that may be apparent to one of skill in the art in possession of the present disclosure that may be used to associate an autonomous vehicle and/or other user device in the physical environment 104 to a purchase transaction and/or a user account of a user of the payment service provider. While a few specific conditions have been discussed with respect to decision block 708, one of skill in the art in possession of the present disclosure will recognize that the payment service provider server may monitor for and determine whether other conditions have been satisfied.

If, at decision block 708, the one or more conditions are not satisfied, then the method 700 may continue to collect the data (e.g., proximity data, risk data, light wave data) discussed above until the one or more conditions are satisfied. In other embodiments, the one or more condition may not be satisfied to an extent that a high risk is involved with the transaction and a notification is sent to the user of the user account and/or the merchant associated with the transaction and the payment token that the transaction cannot be completed, and the transaction fails. In other embodiments, further user verification requests may be sent to the user to verify the authenticity of the user.

If, at decision block 708, the one or more conditions are satisfied, the method 700 may proceed to block 710 where the first payment token is provided to the first merchant. In an embodiment, at block 710, the payment service provider server 110 may provide the payment token to the merchant server 111a. For example, the payment service provider server 110 may transmit the payment token to the merchant server 111a via the network 112 and/or 113. In other embodiments, the payment token may be provided to the merchant server 111a via the physical environment 104. For example, the payment service provider server 110 may provide the payment token to the autonomous vehicle 102a or any of the other devices in the physical environment 104 during any time of the method 700 to store the payment token and then after decision block 708, provide instructions to that device that stores the payment token to the merchant location 106a and/or the merchant server 111a. However, in other embodiments, the payment service provider server 110 may transmit the payment token via the devices in the physical environment 104 to the merchant server 111a. In various embodiments, the route the payment token takes via the physical environment may include any of the relatively long-range and relatively short-range communication interfaces (e.g., 208, 210, 414, 416) provided by the merchant location 106a, the RSE 108, the non-autonomous vehicle 102b, and/or the autonomous vehicle 102a. In various embodiments, the payment token may be provided by the light generator (e.g., the lidar system 308 and/or visual indicator system 242) as an encoded signal within the light waves generated by the light generator and that can be decoded by the visual indicator system 120a at the merchant location 106a.

In various embodiments, after receiving the payment token at the merchant server 111a, the merchant may complete the transaction in a conventional manner such as by, for example, providing the payment token to a card network such that the funding source identified by the payment token may be charged and a purchase completion notification may be provided back to the merchant server 111a, the payment service provider server 110, the merchant location 106a, and/or the user via a user device such as the autonomous vehicle 102a. In various embodiments, the purchase completion notification or other notification in response to the merchant server 111a receiving the purchase completion notification may be provided to the merchant location 106a via a merchant terminal indicating to a merchant associate that the first purchase request has been complete and/or that the user is at the merchant location or nearby the merchant location to receive the good and/or service associated with the first purchase request. As such, the merchant associate may be ready to provide the good and/or service associated with the first purchase request to that user. In some embodiments, the purchase completion notification or the other notification may include a description of the autonomous vehicle 102a and/or any other user identification information so that the merchant associate can provide the good and/or service to the user when the user arrives at the merchant location.

While embodiments of the present disclosure describe the user device (e.g., the autonomous vehicle 102a) as moving through the physical environment 104 and the merchant location 106a being relatively stationary in the physical environment 104. In other embodiments, the user may be relatively stationary (e.g., at home and/or parked in his or her autonomous vehicle) and the autonomous vehicle 102a may be associated with the merchant such that the merchant is moving through the environment. As such, the payment service provider server 110 may still perform method 700 when user and/or user device is relatively stationary and the "merchant location" 106a is moving through the physical environment 104. Similarly, both the "merchant location" 106a and the user/user device (e.g., the autonomous vehicle 102a) may be moving through the physical environment 104.

Also, in various embodiments, the autonomous vehicle 102a may make a stop at the merchant location 106b to pick up a good and/or a service associated with a second purchase request that is associated with a merchant of the merchant server 111b. This stop may be in addition to the stop made for the good and/or service associated with the first purchase request that is associated with the merchant of the merchant server 111a and the merchant location 106a. As such, the payment tokens for the merchant associated with the merchant location 106a and the merchant associated with the merchant location 106b may be prioritized such that the first payment token for the merchant associated with the merchant location 106a may be provided to the merchant server 111a if, at the decision block 708, the payment service provider server 110 determines that conditions for providing that first payment token to the merchant server 111a are satisfied. However, at the same time, not providing a second payment token associated with the merchant of the merchant location 106b if the conditions at decision block 708 are not satisfied for providing the second payment token to the merchant of merchant location 106b and merchant server 111b. In various embodiments, the conditions at decision block 708 may be the same for both the merchant associated with merchant location 106a and the merchant associated with the merchant location of 106b. However, in various embodiments, conditions requiring satisfaction providing the payment token may be merchant specific. As such, the first proximity condition (e.g., 400 m) for the merchant location 106a may be different than a second proximity condition (e.g., 300 m) for the merchant location 106b.

In other various embodiments of method 700, different payment accounts may be associated with each merchant, and thus a first account (e.g., an account associated with a first credit card) may be charged by the payment service provider server 110 when the user comes into proximity of merchant location 106a and a second account (e.g., a user's bank account) may be charged when the user comes into proximity of the merchant location 106b.

Figure 8:
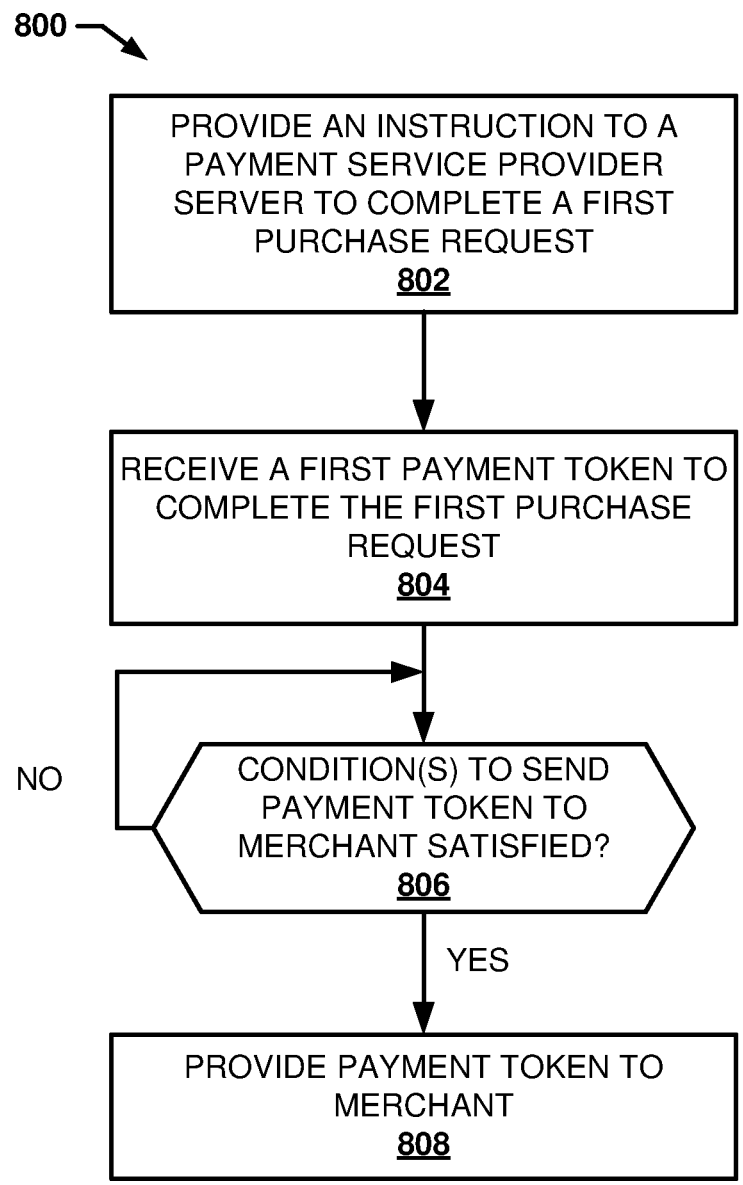
FIG. 8 is a flow chart illustrating an embodiment of a method of proximity-based token issuance.

Referring now to FIG. 8, an embodiment of a method 800 of proximity-based token issuance is illustrated. The method 800 will be discussed in reference to the FIGS. above and method 700. The method 800 begins at block 802 where a user device provides an instruction to a payment service provider server to complete a first purchase request for at least one of a first good or a first service from a first merchant at a first merchant location. In an embodiment, at block 802, a user device such as the autonomous vehicle 102a may provide instruction to the payment service provider server 110 to complete the first purchase request discussed above with reference to method 700 of FIG. 7 for at least one of a first good or a first service from the merchant associated with the merchant location 106a.

The method 800 may proceed to block 804 where the user device may receive a first payment token associated with the first purchase request. In an embodiment, at block 804, the autonomous vehicle 102a may receive the first payment token to complete the first purchase request from the payment service provider server 110. As discussed above, the payment service provider server 110 may generate or cause to generate the first payment token based on the first purchase request. For example, the token service module 604b of the payment service provider server 110 may generate the first payment token. The token service module 604b may include one or more of a token requestor and a token service provider. However, the token requestor and/or the token service provider may be provided by separate entities from the payment service provider server 110 that the payment service provider server 110 communicates with over the network 112 and/or 113. The token requestor and the token service provider may communicate information associated with the user and the purchase request to generate the first payment token as would be appreciated by one of skill in the art in possession of the present disclosure. The payment service provider server 110 may then send the payment token to the autonomous vehicle 102a. In addition, the payment service provider server 110 may provide instruction for the autonomous vehicle 102a as to when to provide the payment token to the merchant. For example, the instructions may include the one or more conditions (e.g., a proximity condition, a risk condition, and/or a light wave signature condition) to the autonomous vehicle 102a such that when the one or more conditions are satisfied, the autonomous vehicle 102a provides the payment token to the merchant. In some embodiments, the payment service provider server 110 may first determine, according to decision block 708, one or more of the conditions before sending the payment token to the autonomous vehicle 102a. In some embodiments, the autonomous vehicle 102a may monitor for a portion of the one or more conditions. For example, the payment service provider server 110 may determine that the risk condition is satisfied before and subsequently provide the payment token and the instruction to the autonomous vehicle 102a to cause the autonomous vehicle 102a to determine whether the proximity condition is satisfied before the autonomous vehicle 102a provides the payment token to the merchant.

The method 800 may then proceed to decision block 806 where the user device determines whether the one or more conditions have been satisfied. In an embodiment, at decision block 806, the autonomous vehicle 102a may determine whether the one or more conditions are satisfied. For example, the autonomous vehicle 102a may include logic to receive the information and perform the operations that are performed by the payment service provider server 110 as discussed in decision block 708 such as, for example, determining whether a first proximity condition is satisfied, determining whether the first risk score is satisfied, determining whether a first light wave signature is detected in the physical environment, and/or any other condition that would be apparent to one of skill in the art in possession of the present disclosure.

If, at decision block 806, the one or more conditions are not satisfied, then the method 800 may continue to collect the data (e.g., proximity data, risk data, light wave data) discussed above until the one or more conditions are satisfied. In other embodiments, the one or more condition may not be satisfied to an extent that a high risk is involved with the transaction and a notification is sent to the user of the user account and/or the merchant associated with the transaction and the payment token that the transaction cannot be completed, and the transaction fails. In other embodiments, further user verification requests may be sent to the user to verify the authenticity of the user.

If, at decision block 806, the one or more conditions are satisfied, the method 800 may proceed to block 808 where the first payment token is provided to the first merchant by the user device. In an embodiment at block 808, the autonomous vehicle 102*a* may provide the first payment token to the first merchant associated with the merchant location 106*a*. For example, the autonomous vehicle 102*a* may transmit the payment token to the merchant server 111*a* via the network 112. In other embodiments, the payment token may be provided to the merchant server 111*a* via the physical environment 104. For example, the autonomous vehicle 102*a* may provide the payment token to the RSE 108, the non-autonomous vehicle 102*b*, the merchant location 106*a* or any of the other devices in the physical environment 104, which may then provide the payment token to the merchant location 106*a* and/or the merchant server 111*a*. In various embodiments, the route the payment token takes via the physical environment 104 may include any of the relatively long-range and relatively short-range communication interfaces (e.g., 208, 210, 414, 416) provided by the merchant location 106*a*, the merchant location 106*a*, the RSE 108, the non-autonomous vehicle 102*b*, and/or the autonomous vehicle 102*a*. In various embodiments, the payment token may be provided by the light generator (e.g., the lidar system 308, any of the visual indicator systems 120*a*-120*d*) as an encoded signal within the light waves generated by the light generator and that can be decoded by the visual indicator system 120*a* at the merchant location 106*a*, the RSE 108, the merchant location 106*b*, and/or the non-autonomous vehicle 102*b*.

In various embodiments, after receiving the payment token at the merchant server 111*a*, the merchant may complete the transaction in a conventional manner such as by, for example, providing the payment token to a card network such that the funding source identified by the payment token may be charged, a purchase completion notification may be provided back to the merchant server 111*a*, the payment service provider server 110, the merchant location 106*a*, and/or the user via a user device such as the autonomous vehicle 102*a*. In various embodiments, the purchase completion notification or other notification in response to the merchant server 111*a* receiving the purchase completion notification may be provided to the merchant location 106*a* via a merchant terminal indicating to a merchant associate that the first purchase request has been complete and/or that the user is at the merchant location or nearby the merchant location to receive the good and/or the service associated with the first purchase request. As such, the merchant associate may be ready to provide the good and/or the service associated with the first purchase request to that user. In some embodiments, the purchase completion notification or the other notification may include a description of the autonomous vehicle 102*a* and/or any other user identification information so that the merchant associate can provide the good and/or service to the user when the user arrives at the merchant location.

Thus, systems and methods of the present disclosure provide for proximity-based token issuance. By providing a payment token to a merchant based on the proximity a user is from that merchant, the systems and methods of the present disclosure provide an improved tokenized payment system relative to conventional electronic payment systems. Contactless payments such as for in store pickups or deliveries may be improved such that the payment may be made in anticipation that the transaction is going to occur rather than waiting until the parties meet or prior to the parties being in route to the rendezvous point, which may be associated with a higher risk and/or time consuming.

Figure 9:
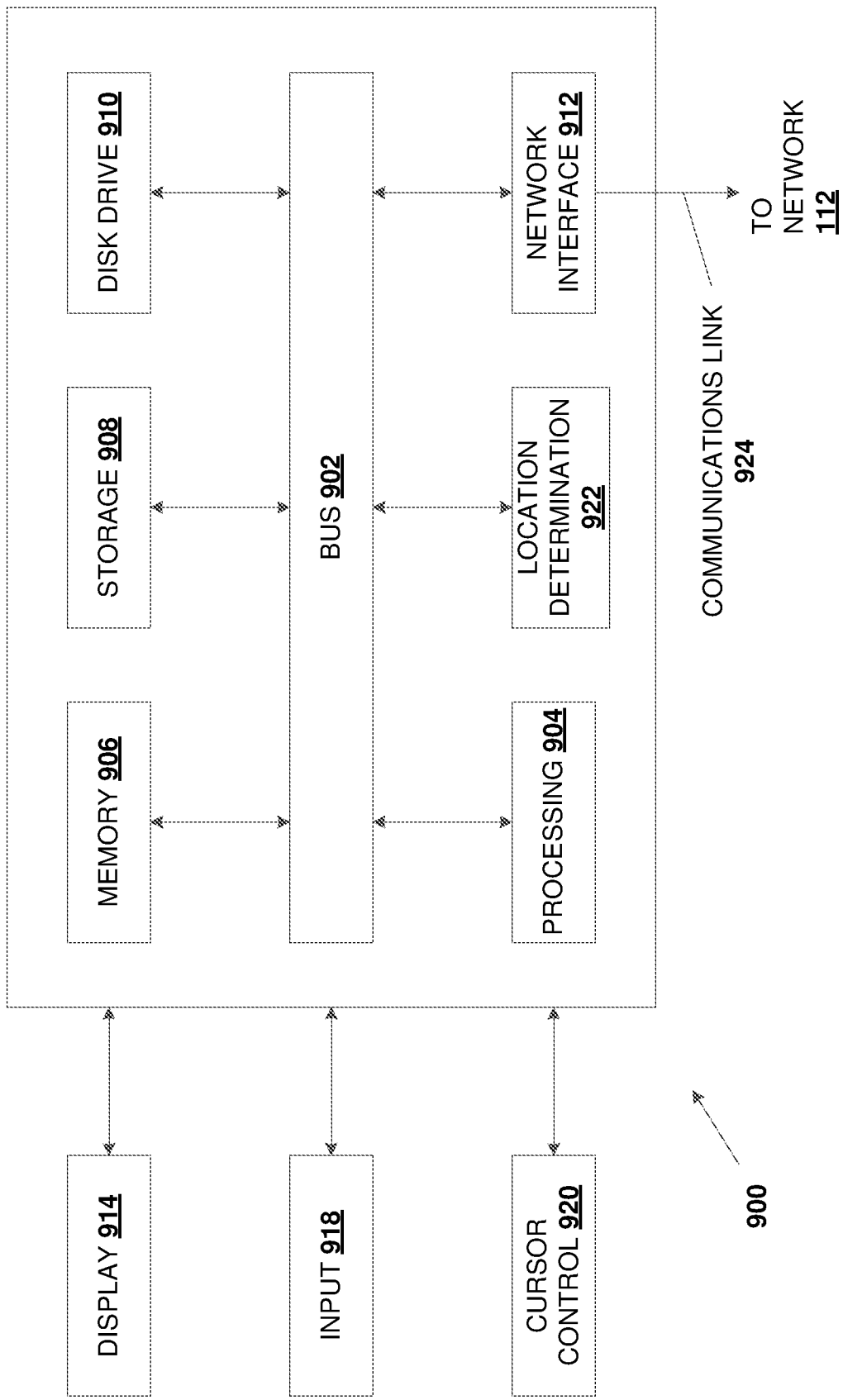
FIG. 9 is a schematic view illustrating an embodiment of a computer system.

Referring now to FIG. 9, an embodiment of a computer system 900 suitable for implementing, for example, the visual indicator systems 120*a*-120*d*, the RSE unit 108 and 400 and the payment service provider server 110 and 600, the merchant server 111*a*, 111*b*, and 500, the non-autonomous vehicle 102*b*, and the autonomous vehicle 102*a* and 200 is illustrated. It should be appreciated that other devices utilized in the proximity-based token issuance system 100 discussed above may be implemented as the computer system 900 in a manner as follows.

In accordance with various embodiments of the present disclosure, computer system 900, such as a computer and/or a network server, includes a bus 902 or other communication mechanism for communicating information, which interconnects subsystems and components, such as a processing component 904 (e.g., processor, micro-controller, digital signal processor (DSP), etc.), a system memory component 906 (e.g., RAM), a static storage component 908 (e.g., ROM), a disk drive component 910 (e.g., magnetic or optical), a network interface component 912 (e.g., modem or Ethernet card), a display component 914 (e.g., CRT or LCD), an input component 918 (e.g., keyboard, keypad, or virtual keyboard), a cursor control component 920 (e.g., mouse, pointer, or trackball), and/or a location determination component 922 (e.g., a Global Positioning System (GPS) device as illustrated, a cell tower triangulation device, and/or a variety of other location determination devices.) In one implementation, the disk drive component 910 may comprise a database having one or more disk drive components.

In accordance with embodiments of the present disclosure, the computer system 900 performs specific operations by the processing component 904 executing one or more sequences of instructions contained in the system memory component 906, such as described herein with respect to the visual indicator systems 120*a*-120*d*, the RSE units 108 and 400, the payment service provider server 110 and 600, the merchant server 111*a*, 111*b*, and 500, the non-autonomous vehicle 102*b*, and the autonomous vehicle 102*a* and 200. Such instructions may be read into the system memory component 906 from another computer-readable medium, such as the static storage component 908 or the disk drive component 910. In other embodiments, hardwired circuitry may be used in place of or in combination with software instructions to implement the present disclosure.

Logic may be encoded in a computer-readable medium, which may refer to any medium that participates in providing instructions to the processing component 904 for execution. Such a medium may take many forms, including but not limited to, non-volatile media, volatile media, and tangible media employed incident to a transmission. In various embodiments, the computer-readable medium is non-transitory. In various implementations, non-volatile media includes optical or magnetic disks and flash memory, such as the disk drive component 910, volatile media includes dynamic memory, such as the system memory component 906, and tangible media employed incident to a transmission includes coaxial cables, copper wire, and fiber optics, including wires that comprise the bus 902 together with buffer and driver circuits incident thereto.

Some common forms of computer-readable media include, for example, floppy disk, flexible disk, hard disk, magnetic tape, any other magnetic medium, CD-ROM, DVD-ROM, any other optical medium, any other physical medium with patterns of holes, RAM, PROM, EPROM, FLASH-EPROM, any other memory chip or cartridge, cloud storage, or any other medium from which a computer is adapted to read. In various embodiments, the computer-readable media are non-transitory.

In various embodiments of the present disclosure, execution of instruction sequences to practice the present disclosure may be performed by the computer system 900. In various other embodiments of the present disclosure, a plurality of the computer systems 900 coupled by a communication link 924 to the network 112 and/or 113 (e.g., such as a LAN, WLAN, PTSN, and/or various other wired or wireless networks, including telecommunications, mobile, and cellular phone networks) may perform instruction sequences to practice the present disclosure in coordination with one another.

The computer system 900 may transmit and receive messages, data, information and instructions, including one or more programs (e.g., application code) through the communication link 924 and the network interface component 912. The network interface component 912 may include an antenna, either separate or integrated, to enable transmission and reception via the communication link 924. Received program code may be executed by processing component 904 as received and/or stored in disk drive component 910 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components, and vice versa.

Software, in accordance with the present disclosure, such as program code or data, may be stored on one or more computer-readable media. It is also contemplated that software identified herein may be implemented using one or more general-purpose or special-purpose computers and/or computer systems, networked and/or otherwise. Where applicable, the ordering of various steps described herein may be changed, combined into composite steps, and/or separated into sub-steps to provide features described herein.

The foregoing is not intended to limit the present disclosure to the precise forms or particular fields of use disclosed. As such, it is contemplated that various alternate embodiments and/or modifications to the present disclosure, whether explicitly described or implied herein, are possible. Persons of ordinary skill in the art in possession of the present disclosure will recognize that changes may be made in form and detail without departing from the scope of what is claimed.

What is claimed is:

1. A system comprising:
a payment service provider server;
a non-transitory memory storing instructions that when executed by the payment service provider server, cause the payment service provider server to perform operations comprising:
receiving sensor data from a sensor at a location of a merchant;
receiving a purchase request for at least one of a good or a service from a server of the merchant over a communication network;
generating a payment token based on the purchase request;
defining a proximity condition indicating a threshold distance between a user device and the location of the merchant before the payment token is provided to the server of the merchant;
associating a risk condition with the defined proximity condition;
receiving, from a position system within the user device over the communication network, location information of the user device;
determining that the received location information of the user device has satisfied the proximity condition based on comparing the received location information of the user device to the threshold distance;
determining that the risk condition is satisfied based on the received sensor data; and
in response to determining that the user device has satisfied the proximity condition and the associated risk condition, providing the payment token to the server of the merchant over the communication network.

2. The system of claim 1, wherein the determining whether the risk condition has been satisfied is based on a comparison between a risk score threshold and a risk score, and wherein the risk score is based on the received sensor data.

3. The system of claim 1, wherein the operations further comprise: receiving a risk notification based on the determining that the risk condition is satisfied.

4. The system of claim 1, wherein the payment token is associated with a first light wave signature, wherein the operations further comprise:
determining that the first light wave signature is detected, wherein the providing the payment token to the server of the merchant is further based on the determining that the first light wave signature has been detected.

5. The system of claim 4, wherein the determining that the first light wave signature has been detected includes:
receiving an additional light wave signature that is detected by a light sensor at the location of the merchant; and
determining that the additional light wave signature corresponds to a stored light wave signature.

6. The system of claim 1, wherein:
the purchase request is a first purchase request, the good is a first good, the service is a first service, the merchant is a first merchant, the location of the merchant is a first merchant location, the payment token is a first payment token, the proximity condition is a first proximity condition; and
the operations further comprise:
receiving a second purchase request for at least one of a second good or a second service from a second merchant at a second merchant location;

generating a second payment token based on the second purchase request, wherein the second payment token is associated with a second proximity condition that is different from the first proximity condition;
determining that a first location of the user device that is associated with the second purchase request does not satisfy the second proximity condition;
determining that a second location of the user device that is associated with the second purchase request satisfies the second proximity condition; and
providing, based on determining that the second location of the user device that is associated with the second purchase request satisfies the second proximity condition, the second payment token to a server of the second merchant.

7. The system of claim 6, wherein the second payment token is associated with an additional light wave signature, and wherein the operations further comprise:
determining that the additional light wave signature is detected, wherein the providing the second payment token to the server of the second merchant is further based on the determining that the additional light wave signature has been detected.

8. The system of claim 1, wherein the user device comprises a vehicle or a portion thereof, or wherein the user device is a mobile device located within the vehicle.

9. A method, comprising:
receiving, by a payment service provider server, sensor data from a sensor at a location of a merchant;
receiving, by the payment service provider server, a purchase request for at least one of a good or a service from a server of the merchant over a communication network;
generating, by the payment service provider server, a payment token based on the purchase request;
defining, by the payment service provider server, a proximity condition indicating a threshold distance between a user device and the location of the merchant before the payment token is provided to the server of the merchant;
associating, by the payment service provider server, a risk condition with the defined proximity condition;
receiving, by the payment service provider server from a position system within the user device over the communication network, location information of the user device;
determining, by the payment service provider server, that the received location information of the user device has satisfied the proximity condition based on comparing the received location information of the user device to the threshold distance;
determining, by the payment service provider server, that the risk condition is satisfied based on the received sensor data; and
in response to determining that the user device has satisfied the proximity condition and the associated risk condition, providing, by the payment service provider server, the payment token to the server of the merchant over the communication network.

10. The method of claim 9, wherein the determining whether the risk condition has been satisfied is based on a comparison between a risk score threshold and a risk score, and wherein the risk score is based on the received sensor data.

11. The method of claim 9, further comprising: receiving, by the payment service provider server, a risk notification based on the determining that the risk condition is satisfied.

12. The method of claim 9, wherein the payment token is associated with a first light wave signature, wherein the method further comprises:
determining, by the payment service provider server, that the first light wave signature is detected, wherein the providing the payment token to the server of the merchant is further based on the determining that the first light wave signature has been detected.

13. The method of claim 12, wherein the determining that the first light wave signature has been detected includes:
receiving, by the payment service provider server, an additional light wave signature that is detected by a light sensor at the location of the merchant; and
determining, by the payment service provider server, that the additional light wave signature corresponds to a stored light wave signature.

14. The method of claim 9, wherein:
the purchase request is a first purchase request, the good is a first good, the service is a first service, the merchant is a first merchant, the location of the merchant is a first merchant location, the payment token is a first payment token, the proximity condition is a first proximity condition; and
the method further comprises:
receiving, by the payment service provider server, a second purchase request for at least one of a second good or a second service from a second merchant at a second merchant location;
generating, by the payment service provider server, a second payment token based on the second purchase request, wherein the second payment token is associated with a second proximity condition that is different from the first proximity condition;
determining, by the payment service provider server, that a first location of the user device that is associated with the second purchase request does not satisfy the second proximity condition;
determining, by the payment service provider server, that a second location of the user device that is associated with the second purchase request satisfies the second proximity condition; and
providing, by the payment service provider server based on determining that the second location of the user device that is associated with the second purchase request satisfies the second proximity condition, the second payment token to a server of the second merchant.

15. The method of claim 14, wherein the second payment token is associated with an additional light wave signature, and wherein the method further comprises:
determining, by the payment service provider server, that the additional light wave signature is detected, wherein the providing the second payment token to the server of the second merchant is further based on the determining that the additional light wave signature has been detected.

16. The method of claim 9, wherein the user device comprises a vehicle or a portion thereof, or wherein the user device is a mobile device located within the vehicle.

17. A non-transitory computer-readable medium having stored thereon instructions that when executed by a payment service provider server, cause the payment service provider server to perform operations comprising:
receiving sensor data from a sensor at a location of a merchant;

receiving a purchase request for at least one of a good or a service from a server of the merchant over a communication network;

generating a payment token based on the purchase request;

defining a proximity condition indicating a threshold distance between a user device and the location of the merchant before the payment token is provided to the server of the merchant;

associating a risk condition with the defined proximity condition;

receiving, from a position system within the user device over the communication network, location information of the user device;

determining that the received location information of the user device has satisfied the proximity condition based on comparing the received location information of the user device to the threshold distance;

determining that the risk condition is satisfied based on the received sensor data; and in response to determining that the user device has satisfied the proximity condition and the associated risk condition, providing the payment token to the server of the merchant over the communication network.

18. The non-transitory computer-readable medium of claim 17, wherein the determining whether the risk condition has been satisfied is based on a comparison between a risk score threshold and a risk score, and wherein the risk score is based on the received sensor data.

19. The non-transitory computer-readable medium of claim 17, wherein the operations further comprise: receiving a risk notification based on the determining that the risk condition is satisfied.

20. The non-transitory computer-readable medium of claim 17, wherein the payment token is associated with a first light wave signature, wherein the operations further comprise: determining that the first light wave signature is detected, wherein the providing the payment token to the server of the merchant is further based on the determining that the first light wave signature has been detected.

* * * * *